United States Patent
Ely et al.

(10) Patent No.: US 6,534,970 B1
(45) Date of Patent: Mar. 18, 2003

(54) ROTARY POSITION SENSOR AND TRANSDUCER FOR USE THEREIN

(75) Inventors: David T. E. Ely, Harston (GB); Ross P. Jones, Harston (GB)

(73) Assignee: Synaptics (UK) Limited, Harston (GB)

( * ) Notice: Subject to any disclaimer, the term of this patent is extended or adjusted under 35 U.S.C. 154(b) by 0 days.

(21) Appl. No.: 09/700,418

(22) PCT Filed: May 24, 1999

(86) PCT No.: PCT/GB99/01638

§ 371 (c)(1),
(2), (4) Date: Nov. 15, 2000

(87) PCT Pub. No.: WO99/61868

PCT Pub. Date: Dec. 2, 1999

(30) Foreign Application Priority Data

May 22, 1998 (GB) .............................................. 9811151

(51) Int. Cl.⁷ .............................. G01B 7/30; G01D 5/20
(52) U.S. Cl. ............................... 324/207.17; 324/207.25
(58) Field of Search ...................... 324/207.17, 207.25, 324/232; 340/870.31; 318/653, 656, 658, 659, 660, 661; 360/68.13

(56) References Cited

U.S. PATENT DOCUMENTS

| | | |
|---|---|---|
| 2,145,742 A | 1/1939 | Wechsung |
| 2,867,783 A | 1/1959 | Childs |
| 2,942,212 A | 6/1960 | Mynall |
| 3,219,956 A | 11/1965 | Newell et al. |
| 3,297,940 A | 1/1967 | Mulligan et al. |
| 3,482,242 A | 12/1969 | Hargrove |
| 3,647,963 A | 3/1972 | Bailey |
| 3,772,587 A | 11/1973 | Ferrand et al. |
| 3,812,481 A | 5/1974 | Stednitz |
| 3,851,242 A | 11/1974 | Ellis |
| 3,895,356 A | 7/1975 | Kraus |
| 3,898,635 A | 8/1975 | Kulterman |
| 3,906,436 A | 9/1975 | Kurauchi et al. |
| 3,962,663 A | 6/1976 | Visser |
| 4,005,396 A | 1/1977 | Fujiwara et al. |
| 4,014,015 A | 3/1977 | Gundlach |
| 4,065,850 A | 1/1978 | Burr et al. |
| 4,081,603 A | 3/1978 | Davis et al. |
| 4,092,852 A | 6/1978 | Fowler et al. |
| 4,094,572 A | 6/1978 | Burr et al. |
| 4,097,684 A | 6/1978 | Burr |
| 4,150,352 A | 4/1979 | Pomella et al. |
| 4,156,192 A | 5/1979 | Schedrovitsky et al. |
| 4,210,775 A | 7/1980 | Rodgers et al. |

(List continued on next page.)

FOREIGN PATENT DOCUMENTS

| | | |
|---|---|---|
| DE | 1134848 | 8/1962 |
| DE | 3500121 A1 | 7/1986 |
| DE | 3620412 A1 | 12/1987 |

(List continued on next page.)

OTHER PUBLICATIONS

Electronics Letters, vol. 11, No. 1, Jan. 9, 1975, pp. 5–6, Gordon, Digital xy Position Indicator Using Walsh Functions.

(List continued on next page.)

*Primary Examiner*—Walter E. Snow
(74) *Attorney, Agent, or Firm*—Nixon & Vanderhye PC

(57) ABSTRACT

A rotary position detector includes first and second members, the first member generating a magnetic field which spatially varies around the axis of rotation in a cyclic manner and the second member sensing the generated magnetic field. In response to the generated magnetic field, first and second signals are generated by first and second sensors respectively, which signals vary with the relative angular position of the first and second members and the relative angular position of the first and second members is determined from the first and second signals.

72 Claims, 17 Drawing Sheets

U.S. PATENT DOCUMENTS

| | | |
|---|---|---|
| 4,223,300 A | 9/1980 | Wiklund |
| 4,255,617 A | 3/1981 | Carau, Sr. et al. |
| 4,341,385 A | 7/1982 | Doyle et al. |
| 4,358,723 A * | 11/1982 | Scholl et al. ............... 318/661 |
| 4,423,286 A | 12/1983 | Bergeron |
| 4,425,511 A | 1/1984 | Borsh |
| 4,482,784 A | 11/1984 | Whetstone |
| 4,504,832 A | 3/1985 | Conte |
| 4,507,638 A | 3/1985 | Brosh |
| 4,532,376 A | 7/1985 | Rockwell |
| 4,577,057 A | 3/1986 | Blesser |
| 4,593,245 A | 6/1986 | Vierti et al. |
| 4,609,776 A | 9/1986 | Murakami et al. |
| 4,642,321 A | 2/1987 | Schoenberg et al. |
| 4,693,778 A | 9/1987 | Swiggett et al. |
| 4,697,144 A | 9/1987 | Howbrook |
| 4,697,244 A | 9/1987 | Murakami et al. |
| 4,704,501 A | 11/1987 | Taguchi et al. |
| 4,709,209 A | 11/1987 | Murakami et al. |
| 4,711,026 A | 12/1987 | Swiggett et al. |
| 4,711,977 A | 12/1987 | Miyamori et al. |
| 4,723,446 A | 2/1988 | Saito et al. |
| 4,734,546 A | 3/1988 | Landmeier |
| 4,737,698 A | 4/1988 | McMullin et al. |
| 4,786,765 A | 11/1988 | Yamanami et al. |
| 4,820,961 A | 4/1989 | McMullin |
| 4,848,496 A | 7/1989 | Murakami et al. |
| 4,868,443 A | 9/1989 | Rossi |
| 4,878,553 A | 11/1989 | Yamanami et al. |
| 4,891,590 A | 1/1990 | Hammel et al. |
| 4,893,077 A | 1/1990 | Auchterlonie |
| 4,902,858 A | 2/1990 | Yamanami et al. |
| 4,963,703 A | 10/1990 | Phillips |
| 4,975,546 A | 12/1990 | Craig |
| 4,985,691 A | 1/1991 | Pulyer et al. |
| 4,999,461 A | 3/1991 | Murakami et al. |
| 5,013,047 A | 5/1991 | Schwab |
| 5,028,745 A | 7/1991 | Yamanami et al. |
| 5,041,785 A | 8/1991 | Bogaerts et al. |
| 5,082,286 A | 1/1992 | Ryan et al. |
| 5,088,928 A | 2/1992 | Chan |
| 5,129,654 A | 7/1992 | Bogner |
| 5,136,125 A | 8/1992 | Russell |
| 5,177,389 A | 1/1993 | Schalk |
| 5,188,368 A | 2/1993 | Ryan |
| 5,381,091 A | 1/1995 | Kobayashi et al. |
| 5,406,155 A | 4/1995 | Persson |
| 5,434,372 A | 7/1995 | Lin |
| 5,486,731 A | 1/1996 | Masaki et al. |
| 5,619,431 A | 4/1997 | Oda |
| 5,625,239 A | 4/1997 | Persson et al. |
| 4,878,553 A | 9/1997 | Yamanami et al. |
| 5,693,993 A | 12/1997 | Ito et al. |
| 5,748,110 A | 5/1998 | Sekizawa |
| 5,783,940 A | 7/1998 | Kolomeitsev |
| 5,815,091 A | 9/1998 | Dames |
| 6,124,708 A | 9/2000 | Dames |

FOREIGN PATENT DOCUMENTS

| | | | |
|---|---|---|---|
| EP | 0159191 | A2 | 10/1985 |
| EP | 0182085 | A3 | 5/1986 |
| EP | 0182085 | A2 | 5/1986 |
| EP | 0209513 | A1 | 6/1986 |
| EP | 0218745 | | 4/1987 |
| EP | 0313046 | | 4/1989 |
| EP | 0537458 | | 4/1993 |
| EP | 0552001 | A1 | 7/1993 |
| EP | 0554900 | | 8/1993 |
| EP | 0607694 | A1 | 7/1994 |
| EP | 0657917 | A1 | 6/1995 |
| EP | 0675581 | A1 | 10/1995 |
| EP | 0680009 | A2 | 11/1995 |
| EP | 0709648 | A2 | 5/1996 |
| EP | 0716390 | | 6/1996 |
| EP | 0743508 | A2 | 11/1996 |
| EP | 0772149 | | 5/1997 |
| FR | 1325017 | | 3/1962 |
| FR | 2298082 | | 8/1976 |
| FR | 2682760 | | 4/1993 |
| GB | 851543 | | 10/1960 |
| GB | 1122763 | | 8/1968 |
| GB | 1452132 | | 10/1976 |
| GB | 2012431 | A | 7/1979 |
| GB | 2021273 | A | 11/1979 |
| GB | 2042183 | A | 9/1980 |
| GB | 2059593 | A | 4/1981 |
| GB | 2064125 | A | 6/1981 |
| GB | 2074736 | A | 11/1981 |
| GB | 1604824 | | 12/1981 |
| GB | 2103943 | A | 3/1983 |
| GB | 2141235 | A | 12/1984 |
| WO | WO 92/12401 | | 7/1992 |
| WO | WO 94/25829 | | 11/1994 |
| WO | WO 95/31696 | | 11/1995 |
| WO | 95/31696 | | 11/1995 |
| WO | WO 96/03188 | A1 | 2/1996 |
| WO | 97/14935 | | 4/1997 |
| WO | WO 98/00921 | | 1/1998 |

OTHER PUBLICATIONS

Patent Abstracts of Japan, vol. 010, No. 009, (P–420), Jan. 14, 1986 & JP 60 165512A (Toshiba KK), Aug. 28, 1985.

Klatt, "Phase of Digital Data Fixes Shaft Angle", Electrical Design News, vol. 16, No. 12, Jun. 15, 1971, pp. 53–56, XP002045871.

Patent Abstracts of Japan, vol. 15, No. 37 (P–1159), Jan. 29, 1991 & JP 02 275314 A (OMRON TATEISI Electron Co), Nov. 9, 1990.

Patent Abstracts of Japan, vol. 10, No. 32 (E–379), Feb. 7, 1986 & JP 60 189231 A (Matsushita Denki Sangyo KK, Sep. 26, 1985.

McDonnel, "The Use of Inductosyn to Digital Converters in Linear Control Systems", Automation, vol. 10, No. 11–12, Nov. 1975–Dec. 1975, pp. 31–32.

Pulle et al, "A New Magnetoresistive Based Sensor for Switched Reluctance Drives" Proceedings of the Annual Power Electronics Specialist Conference (PECS), Toledo, Jun. 29–Jul. 3, 1992, vol. 2, No. CONF, 23, Jun. 29, 1992, pp. 839–843, Institute of Electrical and Electronics Engineers.

* cited by examiner

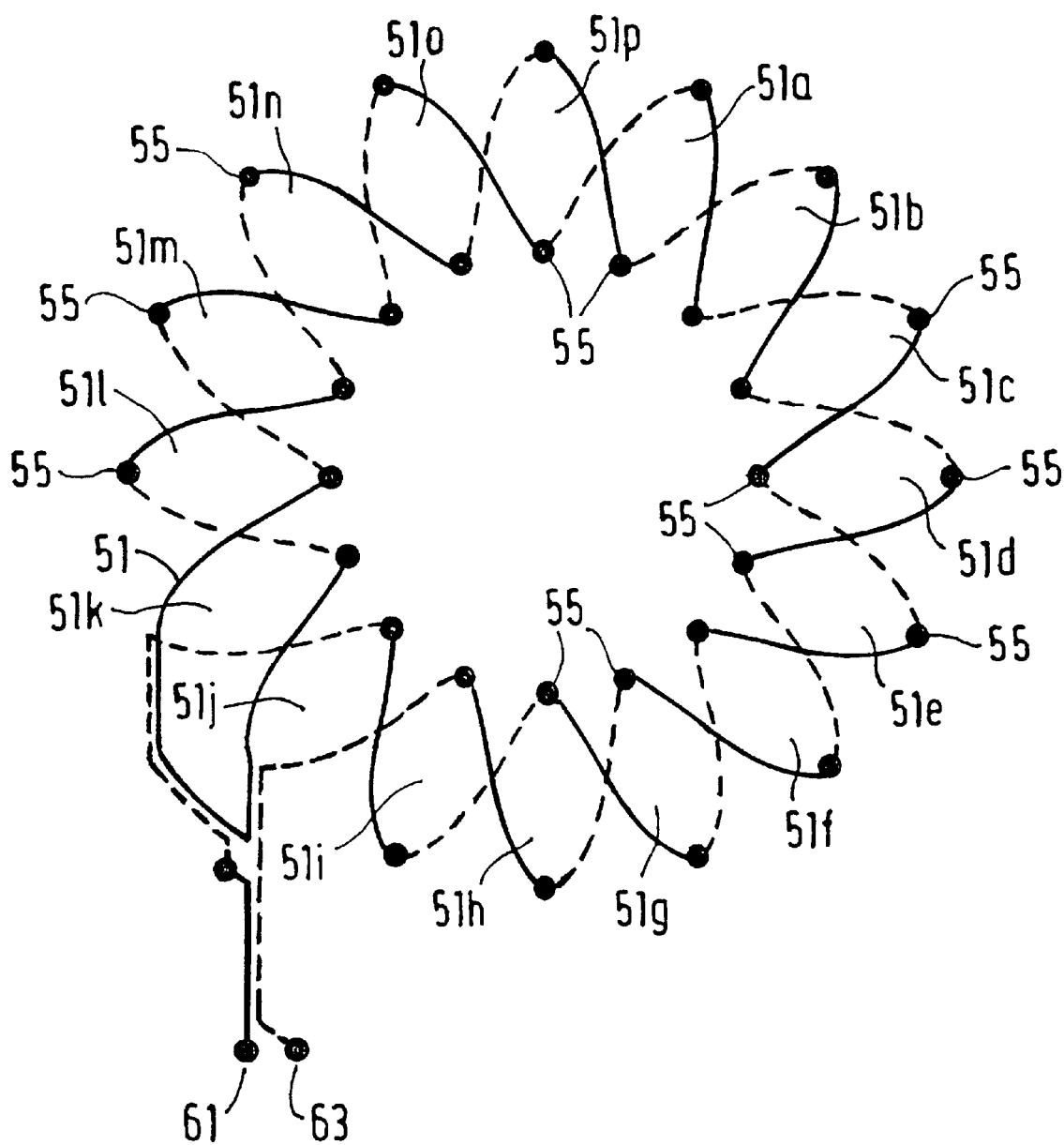

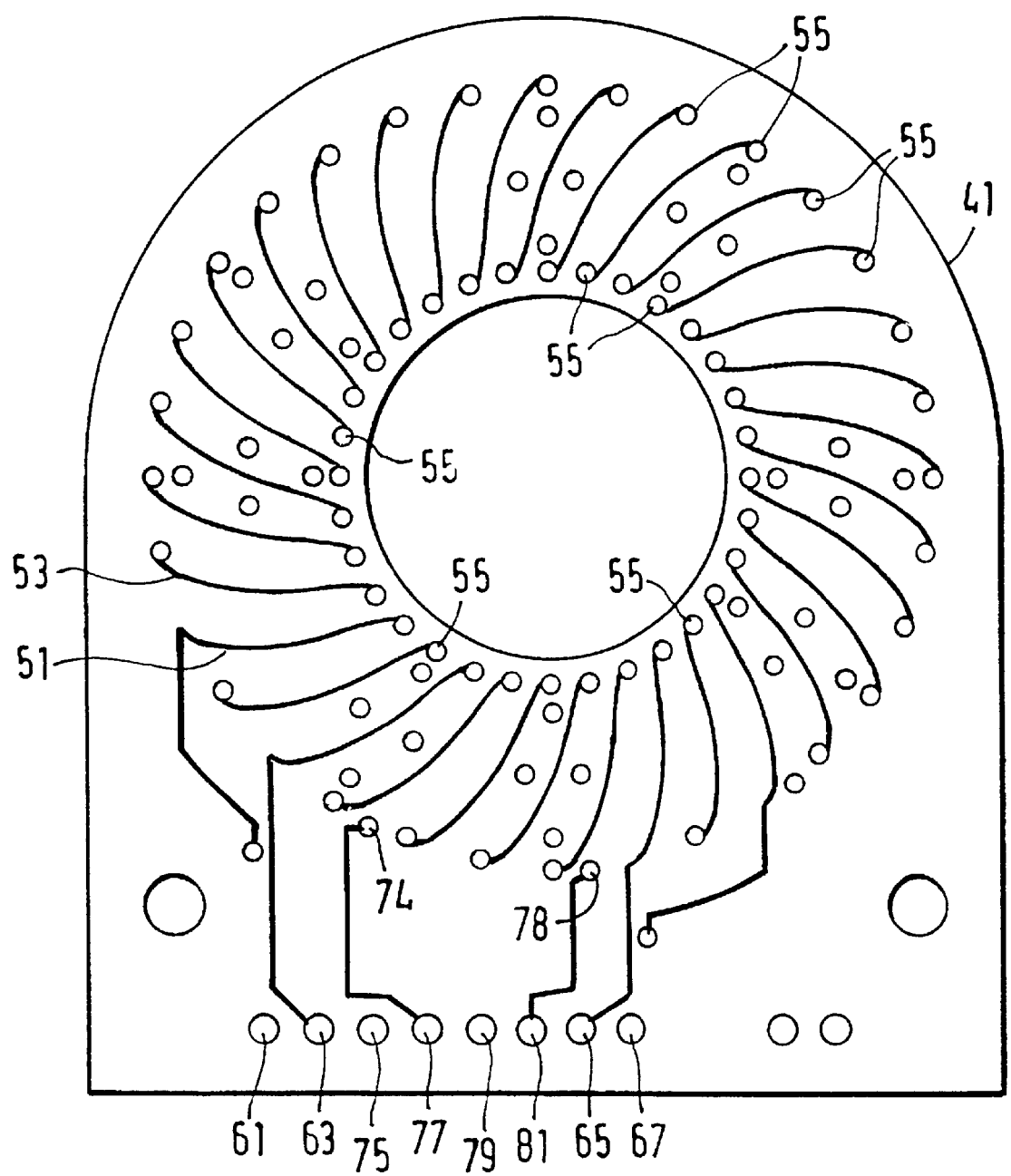

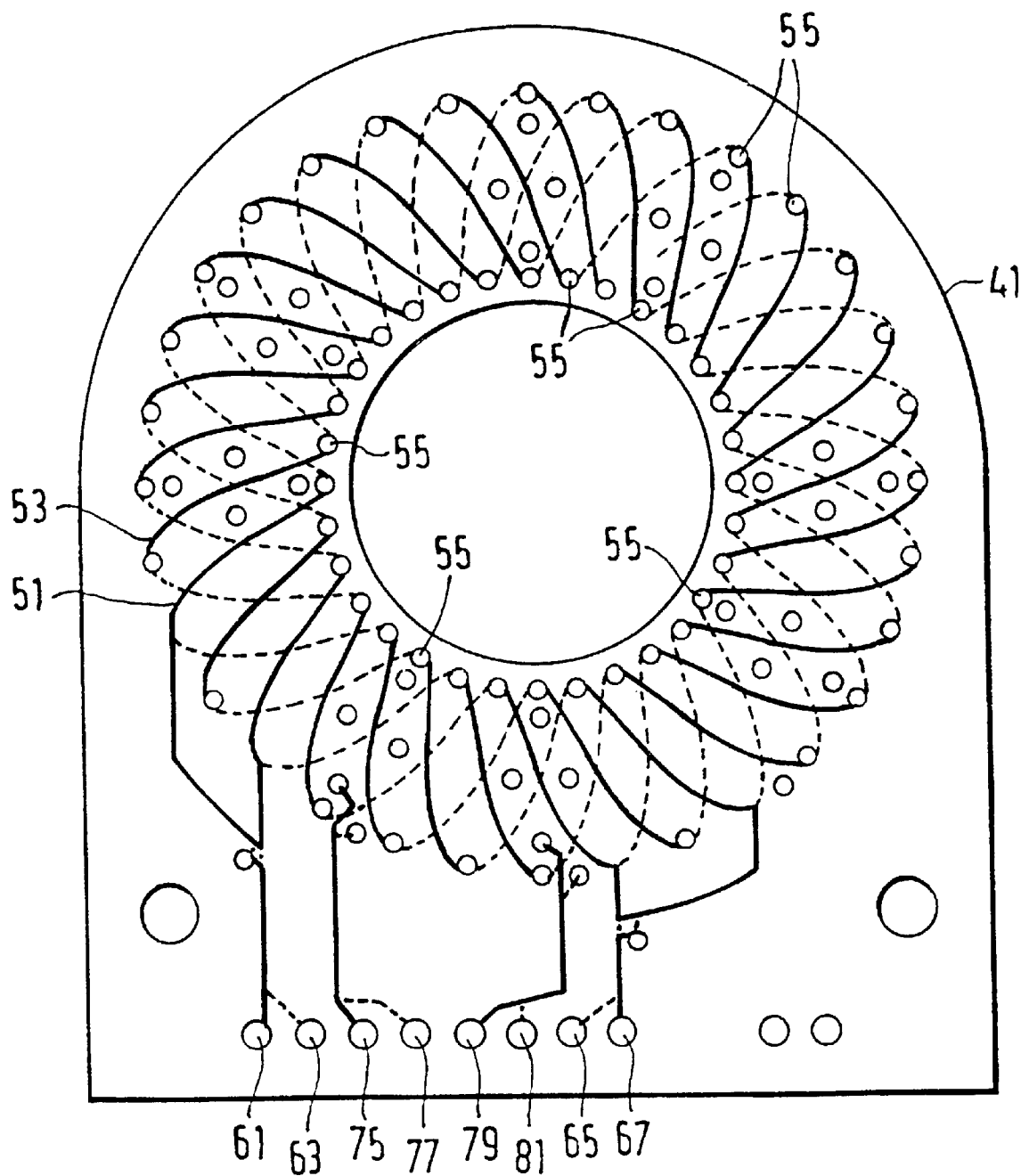

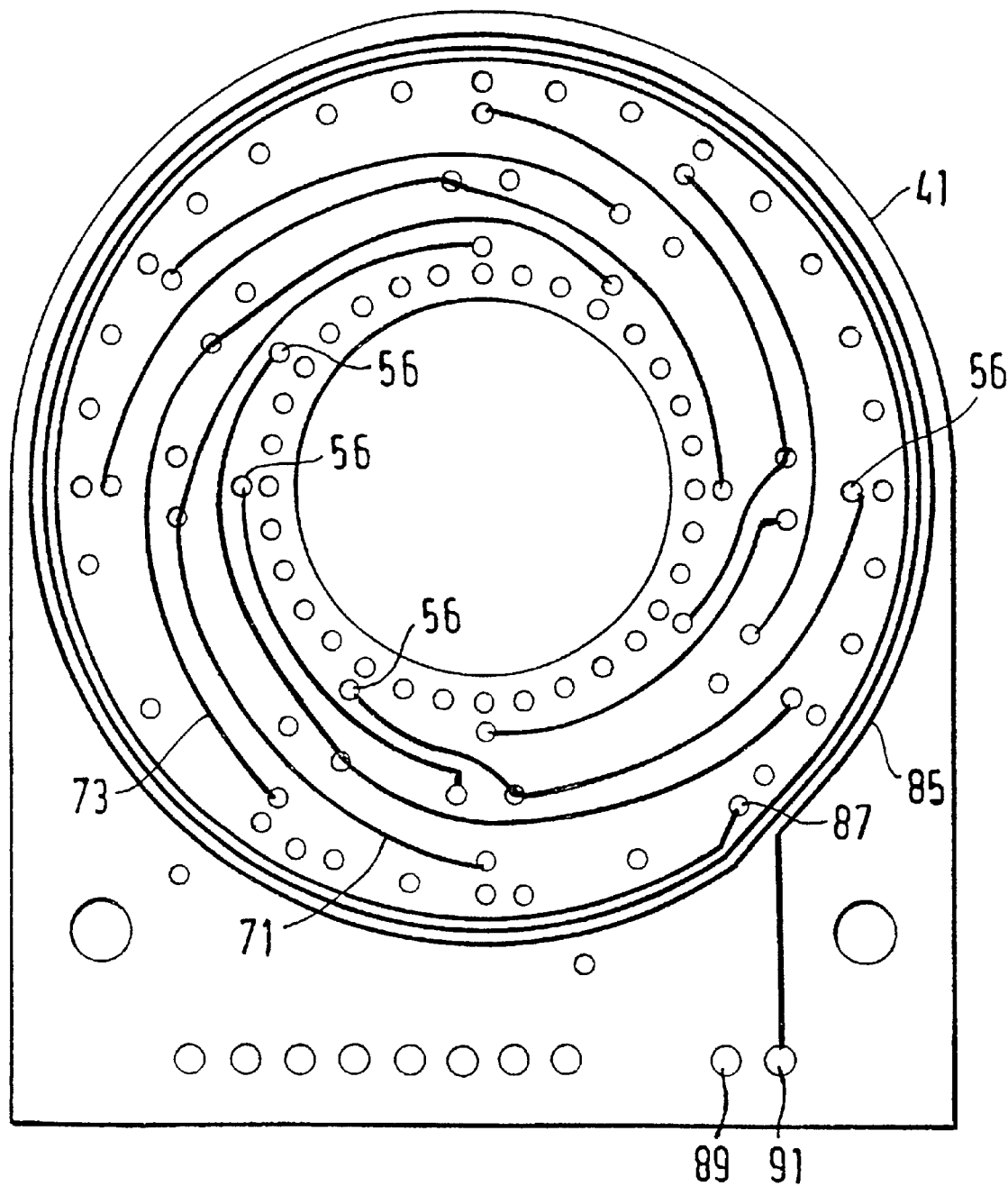

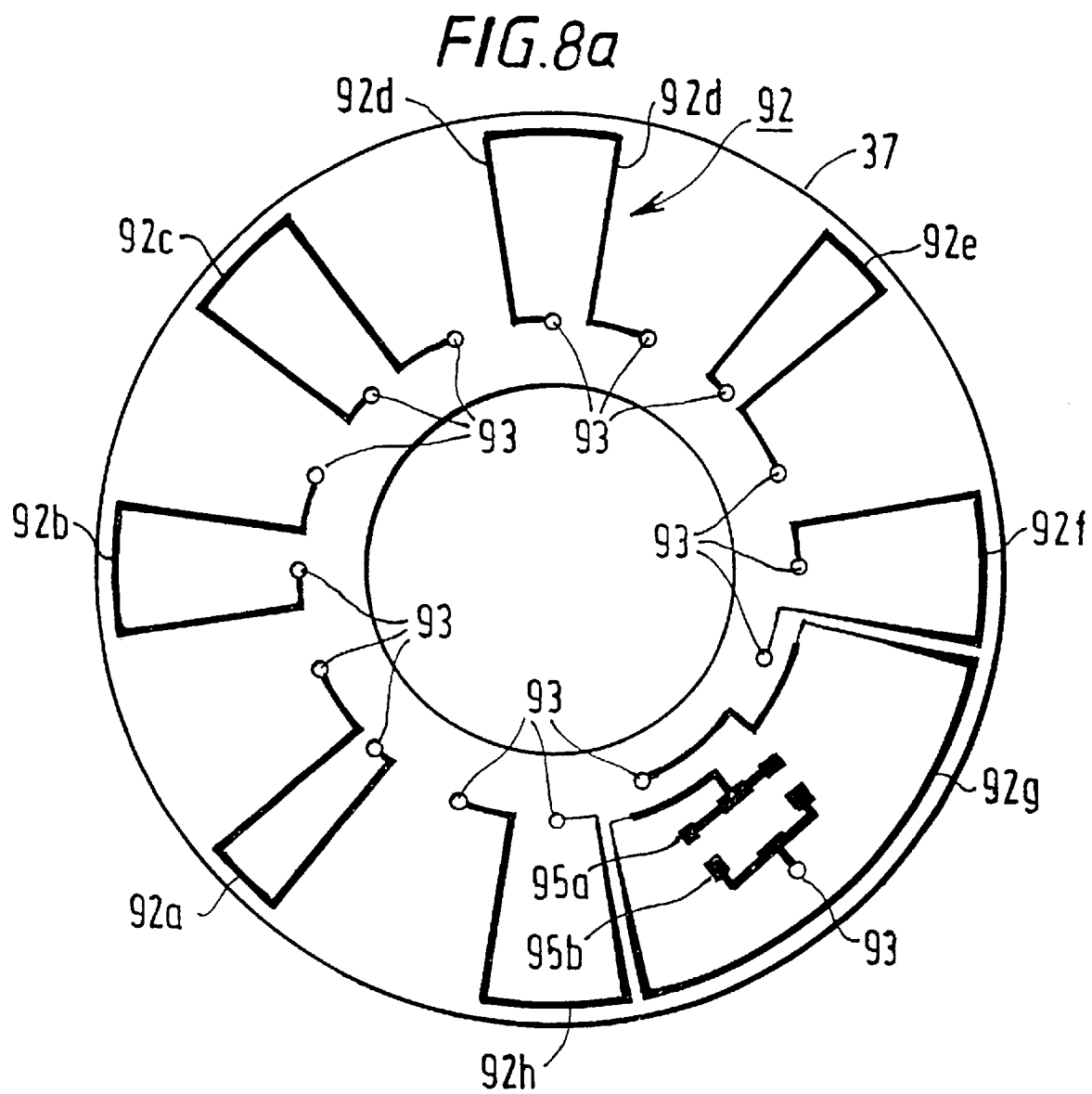

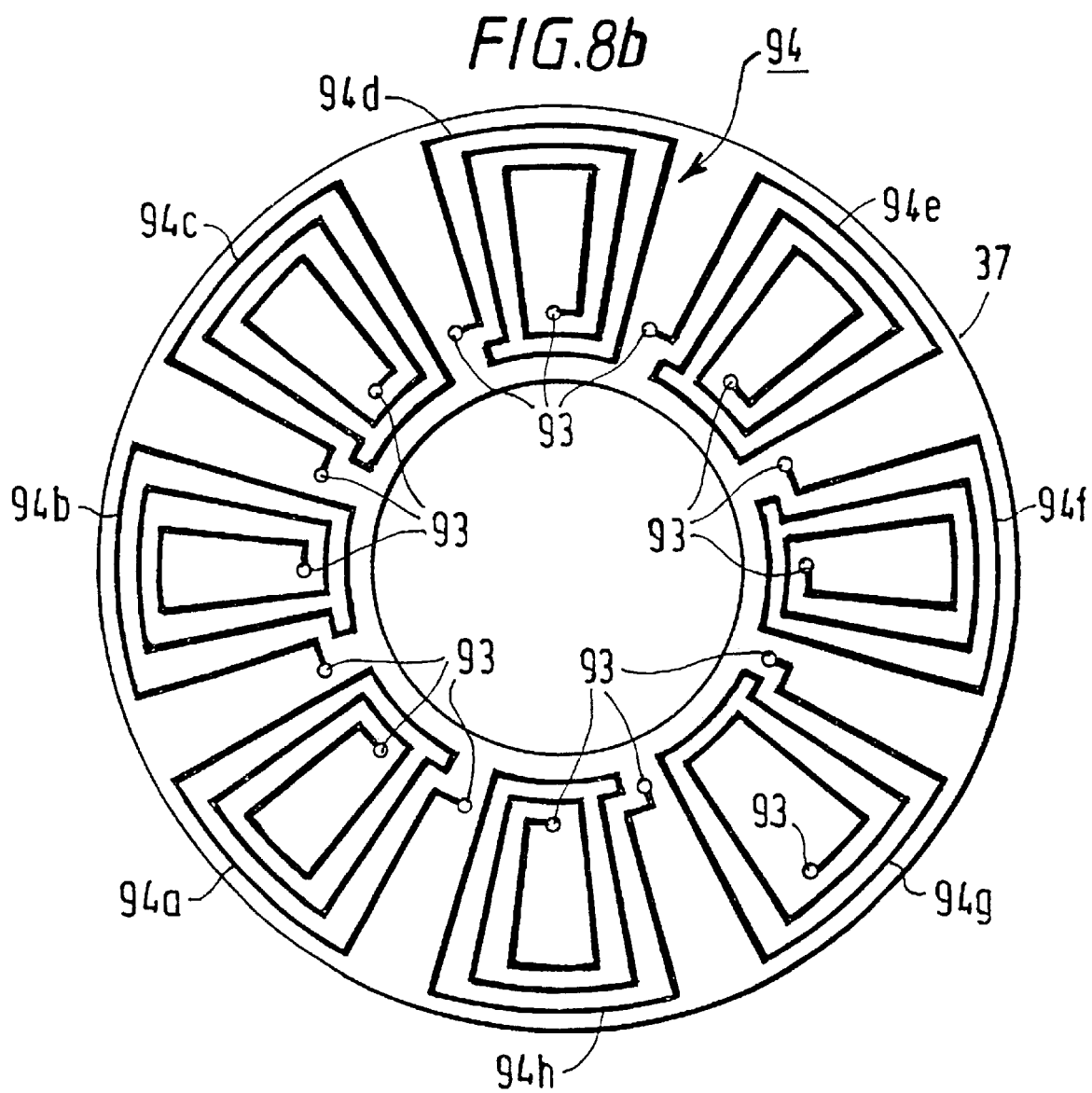

ROTARY POSITION SENSOR AND TRANSDUCER FOR USE THEREIN

RELATED APPLICATION

This application is related to commonly assigned application Ser. No. 09/077,108 filed Sep. 25, 1988, now U.S. Pat. No. 6,124,708 issued Sep. 26, 2000.

1. Field of the Invention

The present invention relates to transducers for use in rotary position sensors in general. The invention has particular although not exclusive relevance to sensors which allow absolute position to be determined over 360° of rotation.

BACKGROUND OF THE INVENTION

Rotary position sensing is used in a number of applications, such as motor position feedback control and/or commutation, cam and crank shaft position sensing for controlling ignition timing, misfire detection, engine speed monitoring etc, robotics, machine tool position control and the like.

Optical encoders, resolvers, reluctance sensors, hall effect sensors and potentiometers are among the most common sensors used for rotary position sensing. Each has its own particular benefits, but no technology offers a truly universal solution. As a result, design engineers require knowledge of a number of sensing technologies and interfaces to solve position sensing problems.

The applicant has already proposed a rotary position sensor in EP 0760087. The system described in this patent has a fixed sensor element, manufactured using printed circuit board (PCB) technology, which carries a number of conductors constructed as a set of quadrature sensor coils and an excitation coil. In operation, an AC current is applied to the excitation coil which generates a uniform AC magnetic field over the sensing area of interest. This magnetic field couples with a wireless, contactless moving electrical PCB resonator comprising a coil and capacitor. In response, the resonator creates its own local oscillating magnetic field at the same AC frequency, which couples back into the sensor coils. The EMFs generated in the sensor coils are then used to determine the resonator position relative to the fixed sensor element.

The pattern of conductors on the sensor element which form the sensor coils are periodic, with three periods extending around the circuit board, thereby allowing absolute position sensing over an angle of 120°. In addition, the coil which forms part of the resonator has three lobes which are symmetrically spaced around the resonator PCB to match the periods of the sensor coils. As a result, both the sensor coils and the resonator coil have rotational symmetry and the system is therefore, relatively immune to effects of unwanted tilt or misalignment between the sensor PCB and the resonator PCB. A full absolute 360° sensor could be made using the teaching of EP 0760087. However, such a position sensor would only be suited to relatively low accuracy 360° measurements because (i) unwanted spatial harmonics and electronic processing artefacts usually limit the accuracy of the device to approximately 0.2% of a period, i.e. ±0.7° in this case; and (ii) the sensor would be more sensitive to offsets and tilts of the resonator PCB relative to the sensor PCB because of the lack of rotational symmetry which would result since the resonator coil would only have a single lobe to match the single period of the sensor coils.

SUMMARY OF THE INVENTION

The present invention therefore aims to provide a more accurate rotary position sensor which is less sensitive to PCB misalignment and tilt.

According to one aspect, the present invention provides a rotary position detector comprising first and second relatively rotatable members, the first member comprising (a) a first field generator for generating a field which spatially varies in a cyclic manner with an angular frequency of M; and (b) a second field generator comprising a winding which is wound so as to have a plurality of loop portions which are circumferentially spaced apart, for generating a field which spatially varies in a cyclic manner and which comprises a fundamental component with an angular frequency of N and some harmonics thereof, wherein N is less than M and wherein the circumferential spacing between the loop portions is arranged so as to reduce the amplitude of predetermined ones of the harmonic components generated by the second field generator; said second member comprising (a) a first sensor which is sensitive to fields which spatially vary in a cyclic manner with an angular frequency of M; and (b) a second sensor which is sensitive to fields which vary in a cyclic manner and with an angular frequency of N; whereby, in response to a magnetic field being generated by the first and second field generators, first and second signals are generated by the first and second sensors respectively, which signals vary with the relative angular position of the first and second members; and means for determining the relative angular position of the first and second members from the first and second signals.

Such a rotary position detector is advantageous because it is less sensitive to misalignments between the magnetic field generators and the sensors because the loop portions of the second field generator have been arranged so as to reduce predetermined ones of the harmonic components. The components which are reduced are preferably those with an angular frequency of M±1, since it is these components which provide the maximum distortion to the position measurement signals when there is a misalignment.

The present invention also provides a transducer for use in such a rotary position detector which comprises the field generators and the sensors discussed above. These field generators and sensors are preferably formed as conductive tracks formed on two or more layers of printed circuit board, since these are relatively easy and cheap to manufacture.

BRIEF DESCRIPTION OF THE DRAWINGS

Exemplary embodiments of the present invention will now be described with reference to the accompanying drawings in which:

FIG. 7a shows a fine sensor winding carried by a sensor printed circuit board which forms part of the encoder shown in FIG. 6;

FIG. 7c shows a second layer of printed conductors which form part of the fine sensor windings on the sensor printed circuit board;

FIG. 7d illustrates the quadrature set of fine sensor windings formed by the printed conductors shown in FIGS. 7b and 7c, when the two layers are superimposed;

FIG. 7f shows a third layer of printed conductors which form part of the coarse sensor windings and an excitation winding on the sensor printed circuit board;

FIG. 8a shows a top layer of printed conductors which forms a first portion of a resonator coil which forms part of the position encoder shown in FIG. 6;

FIG. 8b shows a bottom layer of printed conductors which forms a second portion of the resonator coil;

DETAILED DESCRIPTION OF THE INVENTION

GENERAL DISCUSSION

The present invention is concerned with an inductive rotary position sensor. These devices typically employ a set of sensor windings which are formed on a planar printed circuit board and a magnetic field generator which is spaced apart from the sensor windings and which is operable to induce a signal in the sensor windings which depends upon the relative angular position of the magnetic field generator and the sensor windings. To achieve this, either the sensor windings must be geometrically shaped around the measurement path, so as to have a varying sensitivity to the magnetic field produced by the magnetic field generator, and/or the magnetic field generator must be operable to generate a spatially varying magnetic field. In either case, the relative rotation between the magnetic field generator and the sensor windings results in an output signal which varies in dependence upon the relative angular position between the two.

Figure 1A:
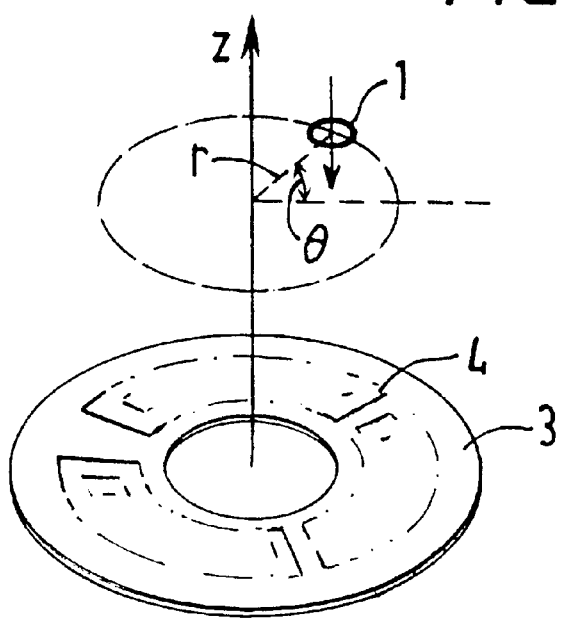
FIG. 1a schematically illustrates a sensor printed circuit board and a point magnetic field source which is rotatably movable about an axis of the printed circuit board.

FIG. 1a schematically illustrates the case in which a movable point magnetic field source 1 is provided relative to a fixed sensor printed circuit board 3. As shown, the point magnetic field source 1 rotates about the z-axis at a distance r therefrom and at a height, z, above the sensor circuit board 3. The sensor printed circuit board 3 carries a plurality of printed conductors 4 which are connected together to form a number of sensor windings (not shown). These sensor windings are geometrically shaped about the z-axis so that as the magnetic field generator 1 rotates about the z-axis, the magnetic coupling between the magnetic field generator 1 and the sensor windings varies with the angle (θ) of rotation.

Figure 1B:
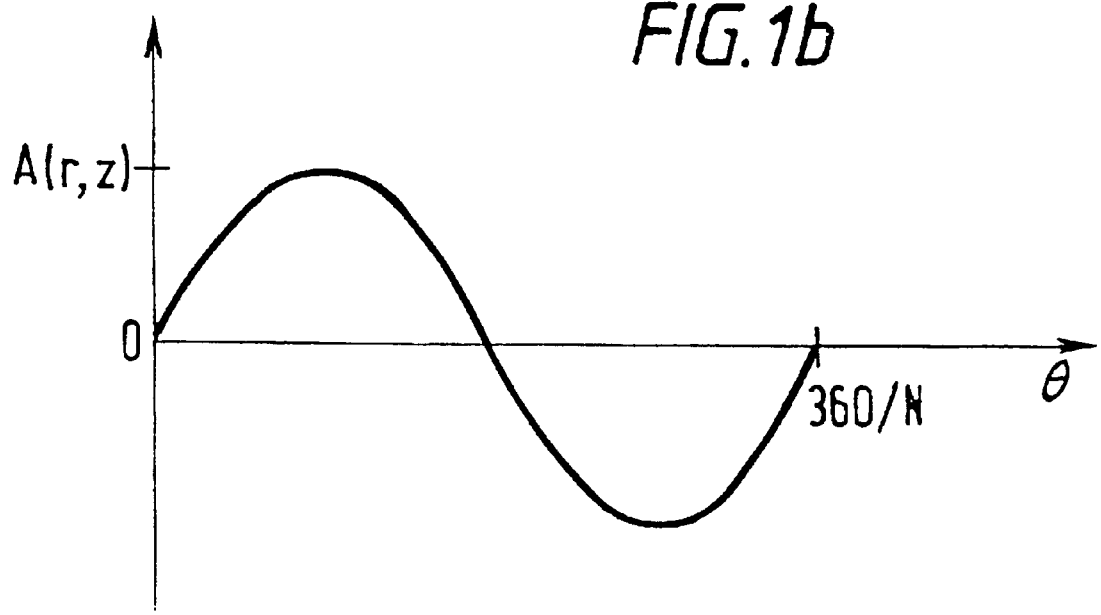
FIG. 1b is a plot illustrating an ideal variation in the magnetic coupling between the magnetic field point source shown in FIG. 1a and sensor coils which are mounted on the printed circuit board shown in FIG. 1a as the point source rotates about the axis.

The present invention is particularly concerned with a rotary position sensor in which the ideal variation of the coupling between the magnetic field generator and the sensor windings is sinusoidal with the rotation angle (θ). Ideally, this will be the same regardless of the radius of rotation, r, or height of rotation, z, of the magnetic field generator 1 relative to the sensor printed circuit board 3. Such an ideal response is illustrated in FIG. 1b, which shows a sinusoidal variation which has a peak amplitude A(r,z) and a period of 360°/N, where N is the number of times the geometric pattern of the sensor windings repeats around the circuit board 3. The sensor windings employed in the rotary position sensor described in EP 0760087, attempt to approximate such an ideal response.

Figure 2A:
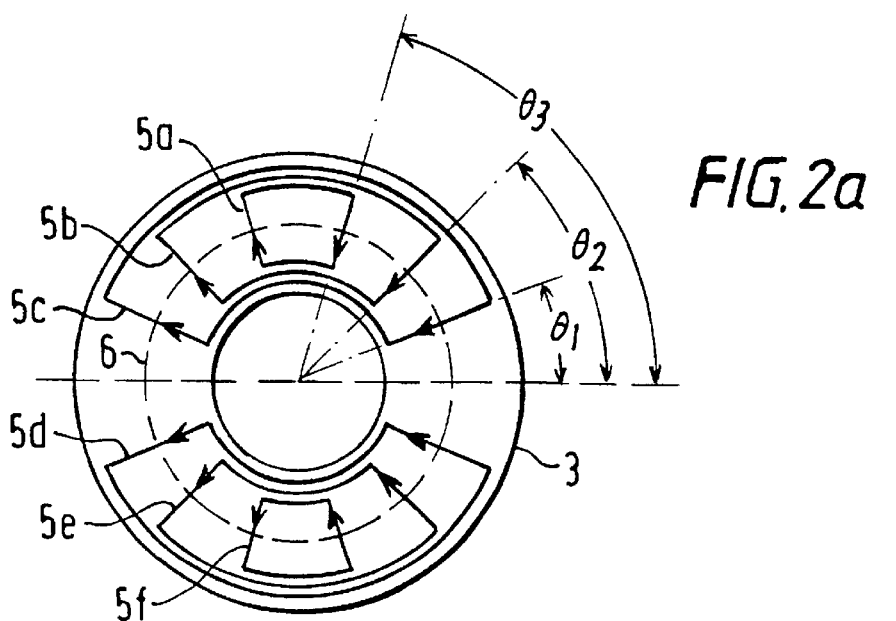
FIG. 2a schematically illustrates the form of a sensor winding which may be formed on the printed circuit board shown in FIG. 1a and which has a coupling with the point magnetic field source which approximates the ideal coupling shown in FIG. 1b.
Figure 2B:
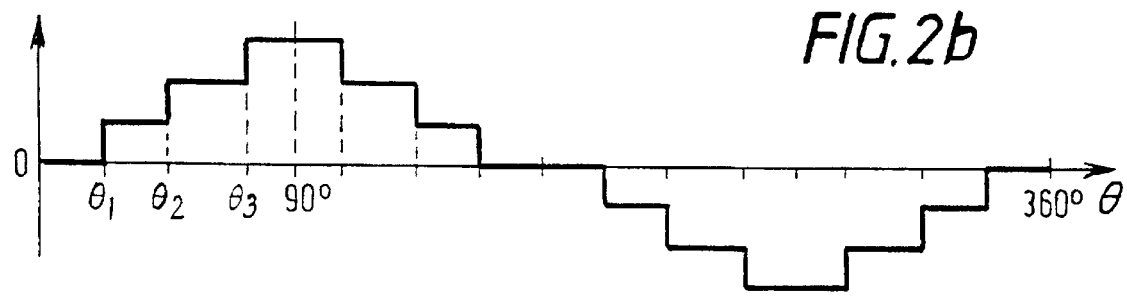
FIG. 2b is a plot which illustrates the sensitivity of the sensor winding shown in FIG. 2a to magnetic fields.

FIG. 2a schematically illustrates the form of a set of conductor loops 5a–5f which are connected together to form a single sensor winding 5. The loops are connected together such that the direction of current flow in loops 5a, 5b and 5c is opposite to the direction of current flow in loops 5d, 5e and 5f. The connections for connecting the loops in this manner are not shown for clarity. As a result of this connection, the sensor winding 5 has a sensitivity to the magnetic field generated by the point magnetic field source 1 which is shown in FIG. 2b, when the field source moves over the surface of the circuit board 3 following path 6. As shown, the sensitivity of the sensor winding 5 is a multilevel square wave signal which approximates a sinusoid with a single period over 360°. Therefore, sensor winding 5 can be used to determine absolute position over 360° of rotation, provided there is a second similar sensor winding which is, for example, in spatial phase quadrature with sensor winding 5.

As shown in FIG. 2*b*, the steps in the sensitivity plot for the sensor winding 5 occur at the angles where the radial wires of the conductor loops 5*a* to 5*f* are located. A Fourier analysis of the sensitivity plot shown in FIG. 2*b* reveals that the sensor winding's sensitivity to magnetic fields has a component which varies with the required sinusoidal variation (i.e. as sin(θ)) as well as harmonic components. However, because of the left-right symmetry of the sensitivity function shown in FIG. 2*b*, there will only be odd sine harmonic components, i.e. components which vary as sin (3θ), sin(5θ), sin(7θ) etc.

Figure 2C:
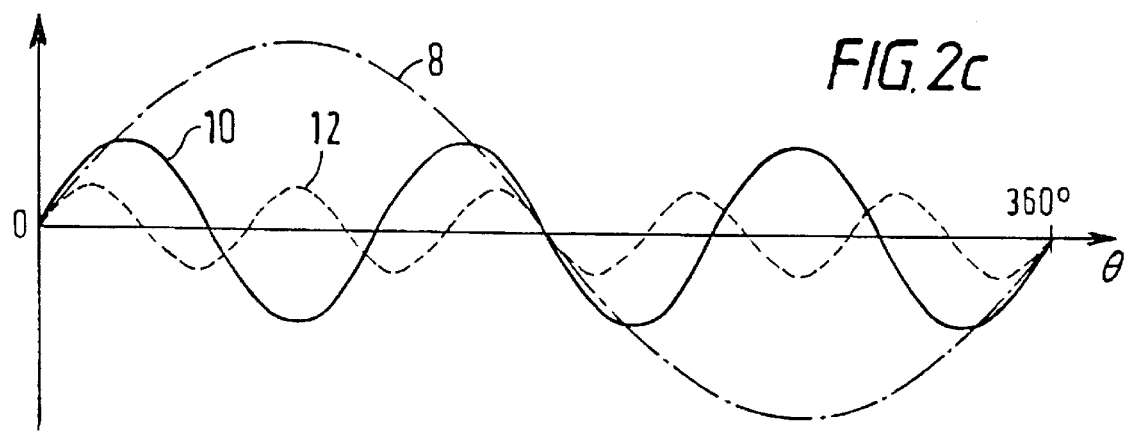
FIG. 2c is a signal plot which shows some of the harmonic components of the sensitivity plot shown in FIG. 2b.

FIG. 2*c* shows the required fundamental component 8, the third harmonic component 10 and the fifth harmonic component 12. As represented by the different amplitudes of the harmonic components, the sensor winding 5 is more sensitive to magnetic fields which vary as sin(θ) than it is for magnetic fields which vary as sin(3θ), sin(5θ) etc. The exact sensitivity to each of the harmonic components depends upon the precise location of the radial wires of the conductor loops 5*a* to 5*f* around the printed circuit board, since these locations define the positions of the steps in the sensitivity plot for the sensor winding. In fact, it is possible to eliminate the sensor winding's sensitivity to some of the harmonic components by the appropriate placement of these radial wires. In particular, the sensor winding's sensitivity to harmonic m can be eliminated by solving the following equation for the angles $\theta_i$:

$$\sum_{i=1}^{L} \cos(m\theta_i) = 0 \quad (1)$$

where L is the number of conductor loops in each half-period of the sensor winding. Generally speaking, the greater the number of conductor loops used in each half-period of sensor winding, the greater the number of harmonics that can be eliminated. For the sensor winding 5 shown in FIG. 2*a*, L=3 and therefore, its sensitivity to three harmonics can be eliminated by appropriate placement of the radial wires of the conductor loops 5*a* to 5*f*. For example, the 3rd, 5th and 7th harmonics can be eliminated by numerically solving the following equations:

$\cos(3\theta_1) + \cos(3\theta_2) + \cos(3\theta_3) = 0$ $\cos(5\theta_1) + \cos(5\theta_2) + \cos(5\theta_3) = 0$ $\cos(7\theta_1) + \cos(7\theta_2) + \cos(7\theta_3) = 0 \quad (2)$ for $\theta_1$, $\theta_2$ and $\theta_3$. Since the sensitivity plot shown in FIG. 2*b* is left-right symmetric about 90°, this is sufficient to define the positions for all the radial wires around the circuit board 3. In practice, there may be more than one solution to the above equations. In this case, the solution which is the easiest to implement would be used.

As those skilled in the art will appreciate, the above analysis will hold for a circular path of any radius which lies between the inner and outer circumferential wires of the conductor loops 5*a* and 5*f*. However, the peak amplitude of the sinusoidal variation will vary with the radius of rotation and will typically be a maximum when the circular path passes approximately through the centre of the conductor loops 5*a* to 5*f*.

Figure 3A:
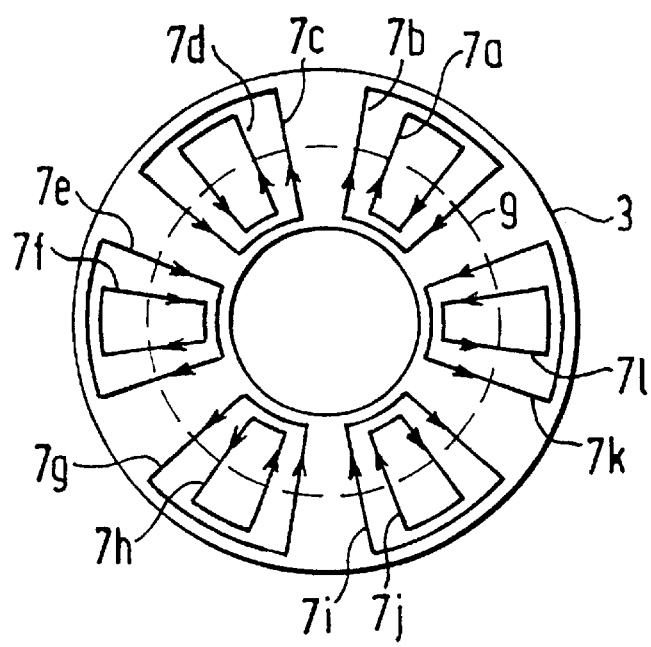
FIG. 3a schematically illustrates the form of a sensor winding which may be formed on the printed circuit board shown in FIG. 1a and which has a coupling with the point magnetic field source which approximates the ideal coupling shown in FIG. 1b and which has three periods of variation around the measurement path.
Figure 3B:
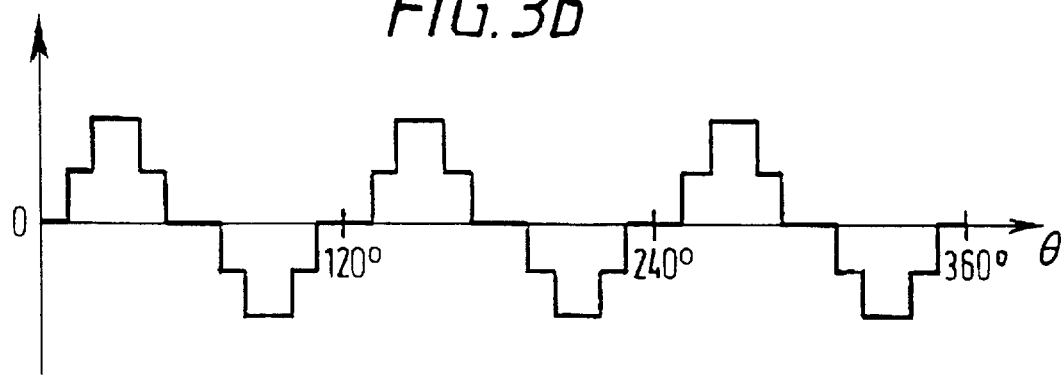
FIG. 3b is a plot which illustrates the sensitivity of the sensor coil shown in FIG. 3a to magnetic fields.

FIG. 3*a* schematically illustrates the form of a set of conductor loops 7*a* to 7*l* which are connected together to form a single sensor winding 7. As represented by the arrows on the conductor loops, there are six sets of loops which are connected together such that the direction of current flow in adjacent sets of loops is opposite. For example, the direction of current flow in loops 7*a* and 7*b* is opposite to the direction of current flow in loops 7*c* and 7*d*. As with the sensor winding shown in FIG. 2*a*, the connections for connecting the loops in this manner are not shown for clarity. As a result of this connection, the sensor winding 7 has a sensitivity to the magnetic field generated by the point magnetic field source 1 which is shown in FIG. 3*b*, when the field source moves over the surface of the circuit board 3 following path 9. As shown, the magnetic sensitivity of the sensor winding 7 is a multilevel squarewave signal which approximates a sinusoid having a period of 120°. This is because the geometric pattern of the sensor winding 7 repeats after 120° (i.e. has a pitch of 120°) and, as a result, can only be used to determine absolute position over a range of 120°, if there is a second similar sensor winding which is phase shifted relative to sensor winding 7.

As with the sensor winding shown in FIG. 2*a*, the steps in the sensitivity function for the sensor winding 7 occur at the angles where the radial wires of the conductor loops 7*a* to 7*l* are located. As a result of these steps, sensor winding 7 is sensitive to magnetic fields which vary like sin(3θ), sin(9θ), sin(15θ) etc. As with the sensor winding shown in FIG. 2*a*, the sensor winding's sensitivity to some of these harmonic components can be eliminated by the appropriate placement of the radial wires of the conductor loops 7*a* to 7*l*. However, since each half-period of the sensor winding 7 only has two conductor loops, its sensitivity to only two of these harmonic components can be eliminated in this manner.

OFFSET ERRORS

Figure 4A:
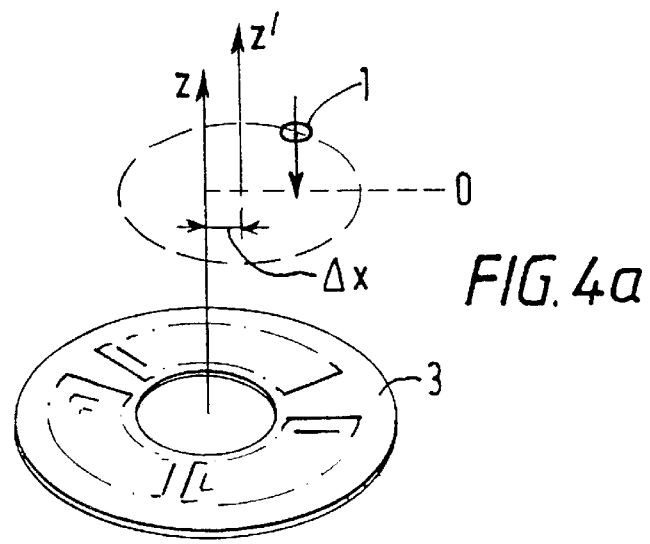
FIG. 4a schematically illustrates the printed circuit board and the path taken by a point magnetic field source which rotates about an axis which is offset relative to the axis of the printed circuit board.
Figure 4B:
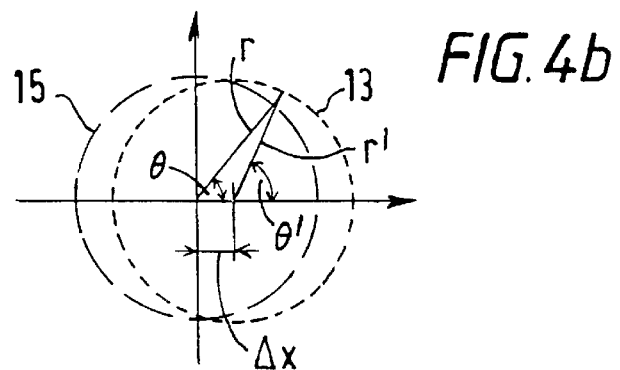
FIG. 4b is a Cartesian plot with the origin of the coordinates representing the axis of the sensor printed circuit board and illustrating the effects of the point source rotating about the offset axis.

FIG. 4*a* schematically illustrates the case in which the movable point magnetic field source 1 rotates about an axis (z') which is offset from the z-axis of the sensor circuit board 3 by an amount (Δx) in the direction of the θ=0 radial line. FIG. 4*b* shows the actual circular path 13 taken by the point magnetic field source 1 and the path 15 which would have been taken by the magnetic field source if there was no offset. As shown in FIG. 4*b*, the radius (r) of the path travelled by the point magnetic field source 1 relative to the axis of the sensor circuit board, oscillates about the radius (r') of rotation about the offset axis, once per revolution. In particular, it is less than r' at θ=0°, equal to r' near θ±90° and greater than r' at θ=180°. In fact, for small offsets, r oscillates about r' like cos(θ). Because the peak amplitude of the signal which couples into the sensor windings depends upon r, this introduces an unwanted amplitude modulation on the signals induced in the sensor winding. Further, as shown in FIG. 4*b*, the angle (θ) of rotation of the point source 1 about the axis of the sensor circuit board 3 also oscillates about the angle (θ') of rotation about the offset axis, once per revolution. In particular, it matches θ' at θ=0° and 180°, it lags θ' at θ=90° and it leads θ' at θ=−90°. In fact, for small offsets, θ oscillates about θ' like −sin(θ). This introduces an unwanted spatial phase modulation of the signals induced in the sensor winding.

Figure 4C:
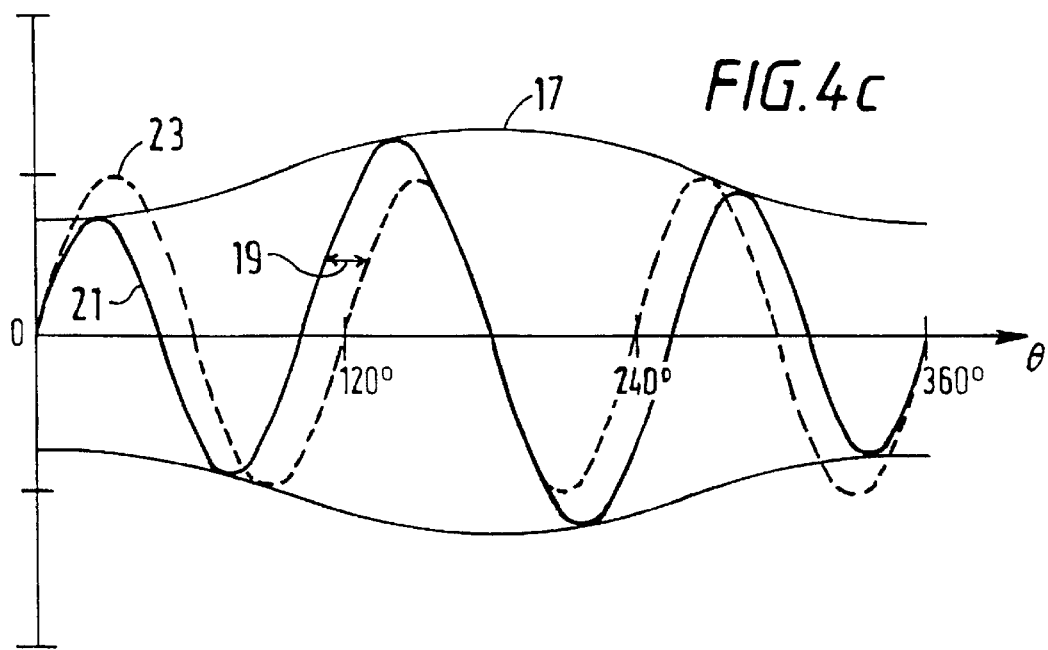
FIG. 4c is a plot illustrating the way in which the offset shown in FIG. 4a distorts the signals generated in the sensor coil.

FIG. 4*c* illustrates the effect of both the amplitude modulation 17 due to the relative radial oscillation as well as the phase modulation 19 due to the relative angular oscillation, to the fundamental signal component which is induced in the sensor winding 7 shown in FIG. 3*a*, which varies as sin(3θ). As can be seen from FIG. 4*c*, these unwanted modulations distort the fundamental signal 23 so that the signal which is actually induced in the sensor winding has the form of signal 21. An analysis of signal 21 reveals that it comprises a component which varies like sin(3θ), a component which varies like sin(3θ)cos(θ) caused by the radial oscillation and a component which varies like cos(3θ)sin(θ) caused by the angular oscillation. The amplitude of these additional components increases linearly with the offset Δx. Therefore, by standard trigonometric relations, the distorted signal 21 will include a component that varies like sin 3θ, a component that varies like ΔX sin(4θ) and a component that varies like ΔX sin(2θ). A more exact analysis reveals that in the general case, the distortion of the fundamental component (sin(Nθ)) by an offset, results in additional components which vary like $\Delta X^i \sin[(N \pm i)\theta]$, for i=1, 2, 3 . . . being induced in the sensor winding.

In addition, as those skilled in the art will appreciate, the offset will distort any harmonic signal components which are induced in the sensor winding in exactly the same way. Therefore, for harmonic component m, in addition to the component which varies like sin(Nmθ), the signals induced in the sensor winding will include the additional components that vary like $\Delta X^i \sin[(Nm \pm i)\theta]$, for i=1, 2, 3 . . .

The above analysis holds true for small values of offset ΔX. In this case, "small" is when ΔX is less than one-tenth of the mean radius of the sensor windings.

TILT ERRORS

Figure 5:
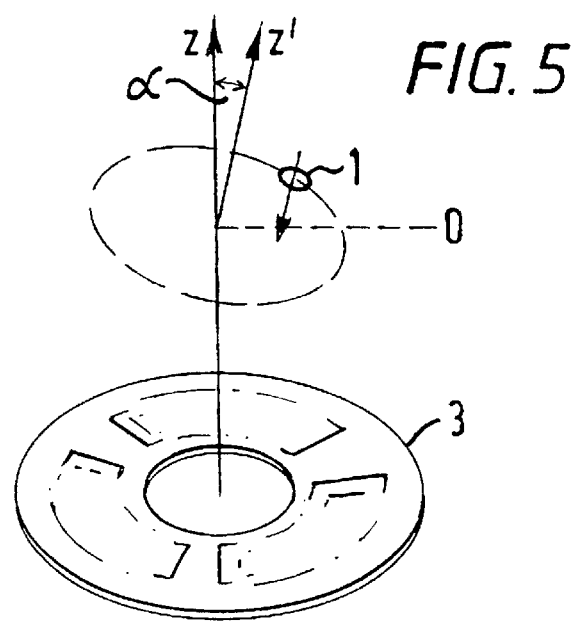
FIG. 5 schematically illustrates a sensor printed circuit board and a point magnetic field source which rotates about an axis which is tilted at an angle relative to the axis of the sensor printed circuit board.

FIG. 5 schematically illustrates the situation when the point magnetic field source 1 rotates about an axis (z') which is inclined by a small angle α about the θ=0 radial line relative to the z-axis of the sensor printed circuit board 3. The effects of tilt are very similar to the effects of offset. In particular, if the point source is at a height z when θ=0, then, for small tilts (less than or equal to 1°), as the point magnetic field source rotates about the inclined axis z', the height of the point source from the surface of the sensor printed circuit board 3 oscillates about z like −cos(θ). Similarly, for small tilts, the radius of the path taken by the magnetic field generator 1 also oscillates with a variation like −cos(θ). Additionally, for small tilts, the observed angle (θ) of rotation oscillates about the actual angle (θ') of rotation like cos(θ). The effects of tilt, therefore produce a similar unwanted amplitude and phase modulation of the signals induced in the sensor winding. As a result, the distorted fundamental component which is induced in the sensor winding results in a component which varies like sin(Nθ), a component that varies like sin(Nθ)cos(θ) and a component that varies like cos(Nθ)cos(θ). Both of these additional components have amplitudes that increase linearly with the tilt, α. A more detailed analysis of the distortions caused by tilt shows that the signals induced in the sensor winding will include components that vary like sin Nmθ and components that vary like $\alpha^i \sin[(Nm \pm i)\theta]$, for i=1, 2, 3, . . .

The above analysis describes the effects of an offset in the direction of the θ=0 radial line and a tilt about the θ=0 radial line. A similar analysis can be performed for any offset and tilt and the results will be the same, although the phases of the additional components may be different.

In the above analysis, a rotary position sensor was described in which a point magnetic field source was movable relative to a fixed sensor printed circuit board which carries spatially shaped sensor windings. As mentioned above, a similar rotary position sensor could be provided by using a magnetic field generator which generates a magnetic field which spatially varies around the measurement path, together with one or more point sensors to detect the spatially varying magnetic field. This spatially shaped magnetic field may be generated by passing a current through a spatially shaped winding, such as the windings shown in FIGS. 2a and 3a. For example, if a current is passed through the winding 5 shown in FIG. 2a, then it will generate a magnetic field which has a component which spatially varies as sin θ, a component which varies as sin 3θ, a component which varies as sin 5θ etc. The amplitude of each of the harmonic components at the surface of the circuit board depends upon the position of the radial wires of the windings shown in FIG. 2a and some of these harmonic components can be eliminated by the appropriate placement of the radial wires (in the same way that the winding's sensitivity to certain harmonic components can be eliminated).

As those skilled in the art will appreciate, the peak amplitude of each of the magnetic field components generated by the winding will decrease with distance from the winding. It can be shown that the fall-off of the magnetic field component which varies as sin(Mθ) is approximately exp[−mz/2π], where z is the distance from the winding. Therefore, the higher order harmonic components fall-off more rapidly than the fundamental and the lower order harmonic components with distance from the winding. Further, it can be shown that with this type of rotary position sensor, the same distortions occur to the signals which are generated in the sensor(s) when there is an offset and/or a tilt in the axis of rotation.

An alternative type of rotary position sensor is one which uses a magnetic field generator which generates a spatially varying magnetic field and sensor windings which have a spatially varying sensitivity to magnetic field. In this type of sensor, however, the pattern of the magnetic field generator winding must correspond with the pattern of the sensor windings, otherwise there will be no coupling between the two. In particular, if the magnetic field generator is operable to generate a magnetic field which spatially varies as sin(Nθ) and two phase quadrature sensor windings are provided, one having a sensitivity to magnetic field which varies as sin(Mθ) and the other which has a sensitivity to magnetic field which varies as cos(Mθ), then the magnetic field generated by the magnetic field generator will only couple with the sensor windings if M=N (ignoring any coupling which may occur with any harmonic magnetic field components). In particular, if the magnetic field generated by the magnetic field generator varies as sin(Nθ) and the magnetic field generator is rotated by then the amplitude of the magnetic field generated by the rotated magnetic field generator will have the following form:

$$\sin(N(\theta+\theta_r))=\sin(N\theta_r)\cos(N\theta)+\cos(N\theta_r)\sin(N\theta) \quad (3)$$

The cos(Nθ) component will only couple with the sensor winding which has a sensitivity to magnetic field which varies as cos(Mθ) and the sin(Nθ) component will only couple with the sensor winding which has a sensitivity to magnetic field which varies as sin(Mθ), provided that M=N. As a result, the signal induced in one of the sensor windings will vary as sin(Nθ$_r$) and the signal induced in the other sensor winding will vary as cos(Nθ$_r$). The angle of rotation θ$_r$ can then be determined from an arc-tangent of the ratio of these two signals.

An analysis of the effects of tilt and/or offset of the axis of rotation with this type of rotary position sensor also shows that the same distortions occur as in the first type of rotary position sensor discussed above.

EMBODIMENT

An embodiment of the present invention will now be described which provides a rotary position sensor which is less sensitive to the effects of tilt and offset and which can measure absolute position over a range of 360°.

Figure 6:
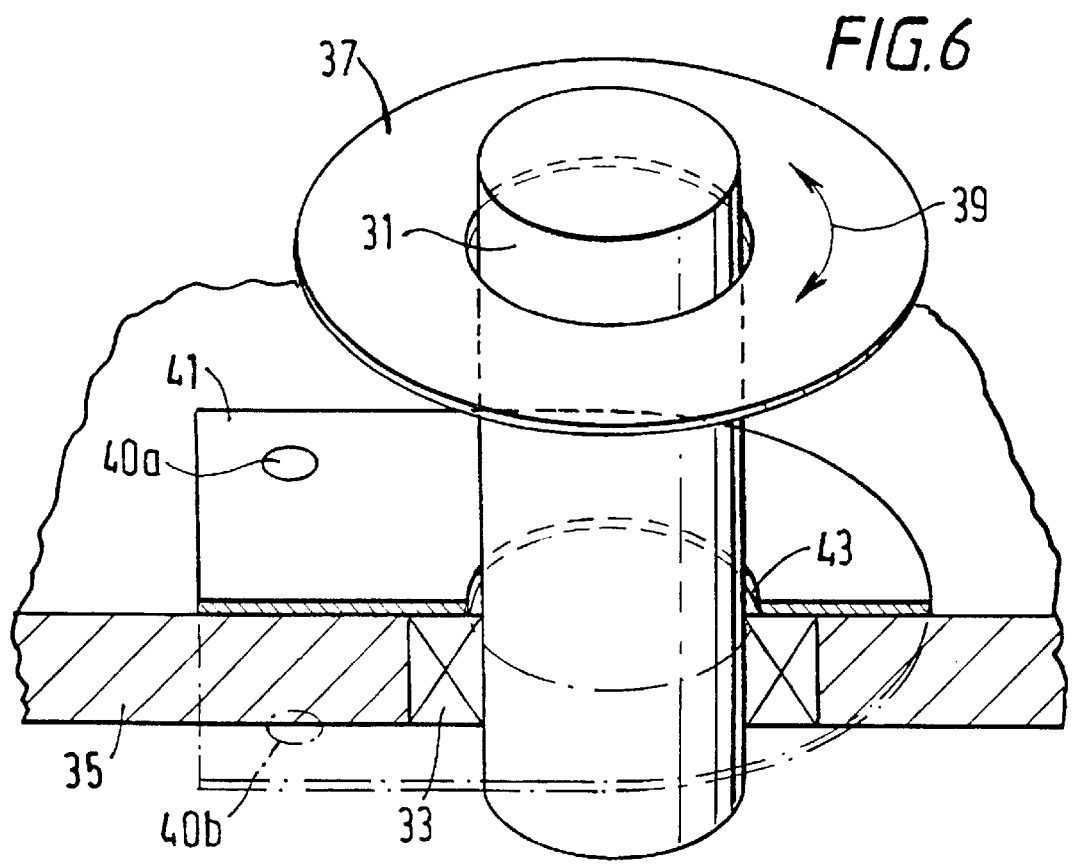
FIG. 6 schematically illustrates a rotating shaft having a position encoder mounted relative thereto, for encoding the position of the rotatable shaft.

FIG. 6 schematically shows a shaft 31 which is rotatable about its axis and which passes through a bearing 33 provided in a support wall 35. A first printed circuit board 37 carrying a resonator (not shown) is mounted for rotation (as represented by arrow 39) with the shaft 31 via a bushing (not shown) adjacent a second printed circuit board 41 (shown in cross-section) which carries a number of sensor windings (not shown) and an excitation winding (not shown). In this embodiment, the separation between the two printed circuit boards is between approximately 0.1 mm and 4 mm. The second printed circuit board 41 is fixed to the support wall 35 at the fixing holes 40a and 40b and has a central hole 43 through which the rotatable shaft 31 passes. The excitation winding, sensor windings and the resonator are arranged such that when an excitation current is applied to the excitation winding, the resonator is energised which in turn induces signals in the sensor windings, the peak amplitudes of which vary sinusoidally with the angle of rotation of the shaft 31. The sensor windings are connected to processing electronics (not shown) which processes the induced signals to determine the rotational angle of the rotatable shaft 31.

SENSOR WINDINGS

In this embodiment, the circuit board 41 carries a pair of coarse sensor windings which can be used to determine absolute position over 360° of rotation and a pair of fine sensor windings which can be used to determine absolute position over 45° of rotation. In this embodiment, the two coarse sensor windings are in spatial phase quadrature with each other and the two fine sensor windings are in spatial phase quadrature with each other. In this embodiment, the coarse and the fine sensor windings are formed on a four-layer printed circuit board 41 having an approximate diameter of 44 mm, with the conductors for the fine sensor windings being provided substantially over two of the layers and the conductors for the coarse sensor windings being provided substantially on the other two layers. In this embodiment, the two layers which carry the conductors for the fine sensor windings are the layers which, in use, are nearest to the resonator circuit board 37. This ensures that there is maximum coupling between the resonator and the fine sensor windings.

FIG. 7a shows the form of one of the fine sensor windings 51. As shown, the sensor winding 51 crosses itself sixteen times over 360°. As a result, the sensor winding 51 must be formed by conductor tracks on two separate layers of the sensor circuit board 41. The tracks which are on one layer of the circuit board are shown in full lines and the tracks which are on the other layer are shown in dashed lines. These tracks are then connected together at the via holes, some of which are numbered 55.

Since the performance of the position sensor as a whole depends on the output of the Line sensor windings, the accuracy of the fine sensor windings has been optimised by using a highly symmetrical winding arrangement. In particular, the fine sensor windings have been laid along paths defined by the following equation:

$$R_0 + R_1, \sin[8\theta + \phi] \quad (4)$$

where $R_0$ is the average radius and $R_1$ is the radial deviation and $\phi$ is the starting phase (which for winding 51 equals 0° and 180°). In this embodiment, $R_0$ is approximately 15 mm and $R_1$ is approximately 4.5 mm. $R_1$ has been set as large as possible given the physical constraints of the circuit board size, in order to maximise area and hence coupling to the resonator which in turn results in larger signal levels and higher angular resolution. As shown in FIG. 7a, the resulting sensor winding 51 comprises sixteen loops 51a to 51p of series connected conductors, connected such that adjacent loops are wound in the opposite sense. Thus any EMF induced in one loop by a common magnetic field will oppose the EMF induced in an adjacent loop. In this embodiment, the area enclosed by each loop is approximately the same, thereby making each sensor winding relatively immune to background electromagnetic interference, since EMFs induced in adjacent loops substantially cancel each other out. This also reduces any coupling between the excitation winding (not shown) and the fine sensor windings, since the excitation winding is operable to generate a uniform magnetic field around the sensor circuit board 41.

As a result of the periodic nature of the fine sensor winding 51, it will be sensitive to magnetic fields which vary as $\sin(8\theta)$, $\sin(24\theta)$, $\sin(40\theta)$ etc. As mentioned above, the other fine sensor winding is in spatial phase quadrature with sensor winding 51, and therefore, it will be sensitive to magnetic fields which vary as $\cos(8\theta)$, $\cos(24\theta)$, $\cos(40\theta)$ etc.

Figure 7B:
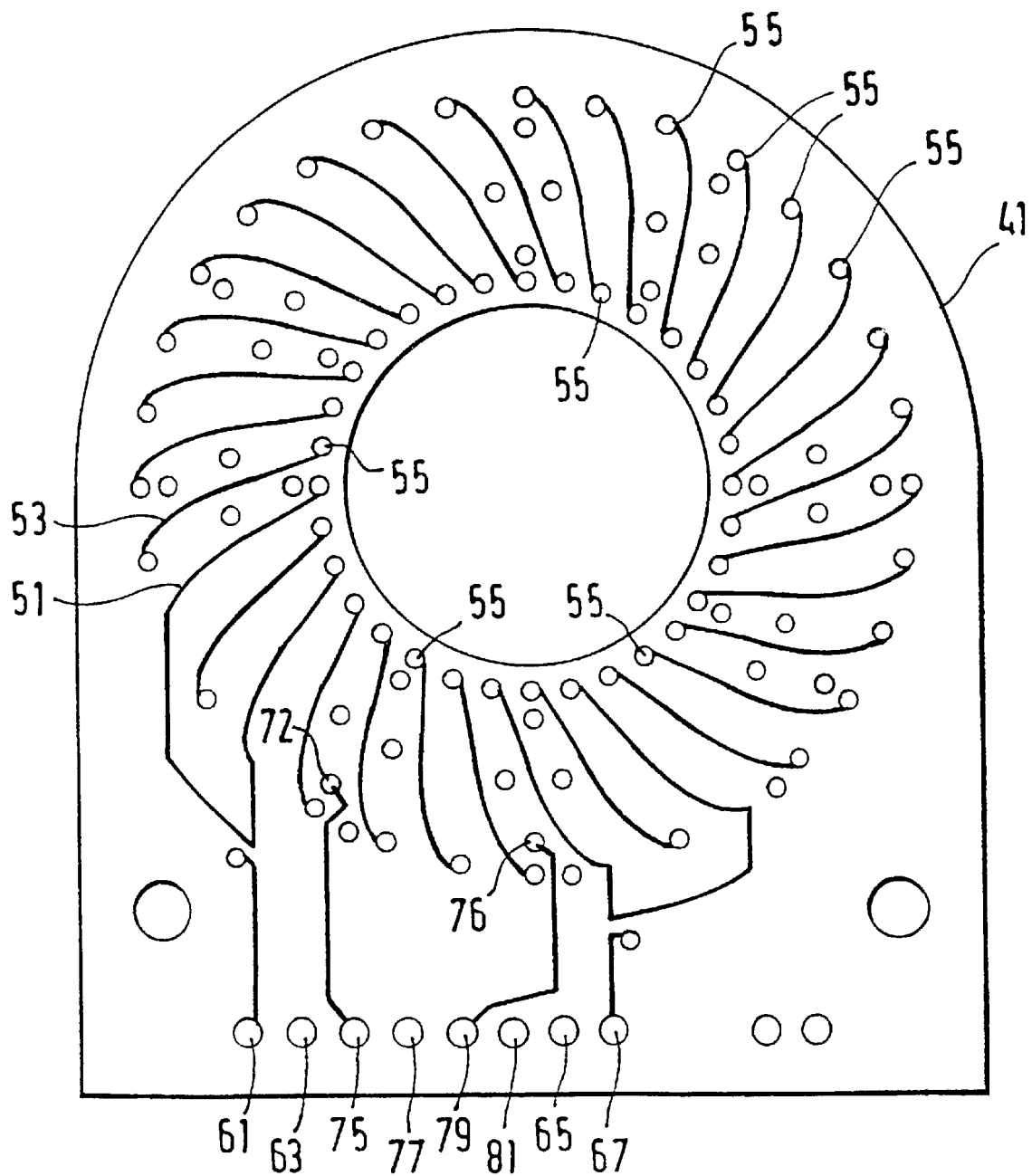
FIG. 7b shows a first layer of printed conductors which form part of the fine sensor windings on the sensor printed circuit board.

As mentioned above, the fine sensor windings are formed by two layers of conductor tracks with through vias where appropriate. FIGS. 7b and 7c show the two conductor layers which carry the conductors for the two fine sensor windings and FIG. 7d shows the resulting two fine sensor windings 51 and 53 which are formed when the first and second layers of conductors shown in FIGS. 7b and 7c are superimposed over each other and the tracks in each layer are connected at the via holes 55. In this embodiment, the conductor tracks shown in FIG. 7c are drawn as they would be seen from the first layer shown in FIG. 7b. As shown in FIG. 7d, the fine sensor winding 53 has the same form as fine sensor winding 51, but is circumferentially spaced from sensor winding 51 by 11.25° (representing a quarter of a period of the fine sensor windings). FIG. 7d also shows that the ends of sensor winding 51 are connected to a pair of connection pads 61 and 63 by a pair of connection tracks which follow each other on the first and second layers of the circuit board 41, thereby minimising any magnetic coupling between the connection tracks and the resonator. Similarly, the ends of sensor winding 53 are connected to a pair of connection pads 65 and 67 by a pair of connection tracks which follow each other on the first and second layers of the circuit board 41 to again minimise any magnetic coupling between the connection tracks and the resonator.

Figure 7E:
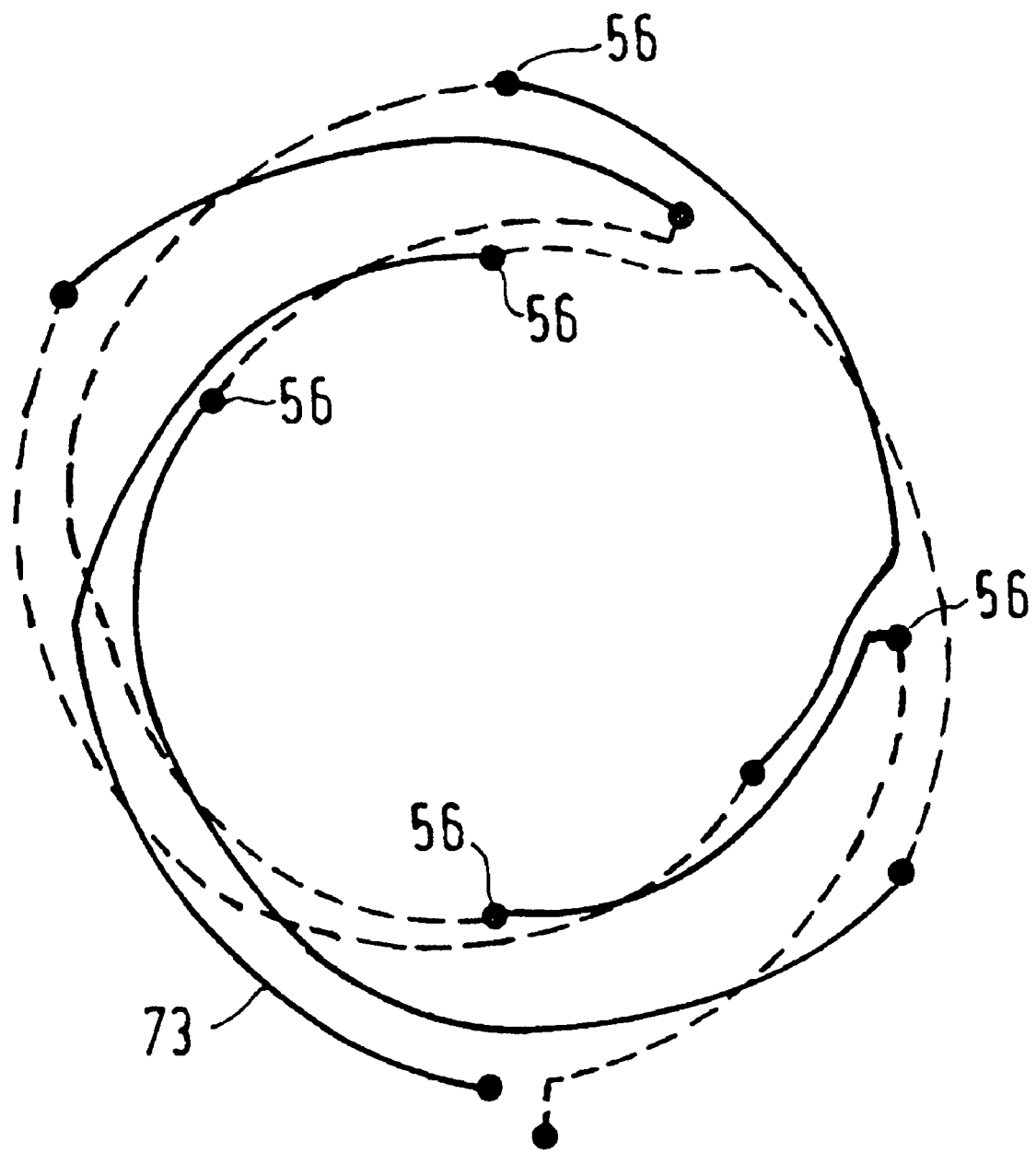
FIG. 7e shows a coarse sensor winding carried by the sensor printed circuit board.

FIG. 7e shows the form of one of the coarse sensor windings 71, which is in substantially the same position (although on different layers) as the fine sensor windings 51 and 53. In this embodiment, the via holes 55 which are used to connect the conductor tracks of the fine sensor windings extend from the top layer of the printed circuit board through to the bottom layer, since this type of via is less expensive to manufacture than blind via holes which do not connect all the way through the circuit board. As a result, the design of the coarse sensor winding 71 is limited by the pattern and the connecting vias of the fine sensor windings 51 and 53. However, this is not critical because, in theory, the coarse sensor windings only need to provide a position indication to within approximately ±1/16 of a circle although to account for manufacturing tolerances etc., the coarse windings are typically designed to be accurate to at least ±1/32 of a circle.

In this embodiment, sensor winding 71 has two turns of conductor, each of which follows a path similar to the fine sensor windings, except with one period per 360°. The radial deviation ($R_1$) of the coarse sensor winding 71 is smaller, since high resolution is not required and signal level may therefore be sacrificed. Since the coarse sensor winding 71 has one period per 360° of rotation, it will be sensitive to a magnetic field which varies as sin θ. It will also be sensitive to magnetic fields which vary as sin 2θ, sin 3θ, sin 4θ etc., since the coarse sensor winding 71 is not as symmetric as the fine sensor windings 51 and 53. The second coarse sensor winding has the same general form as coarse sensor winding 71 but is circumferentially spaced from coarse sensor winding 71 by 90° so that the two coarse sensor windings are in phase quadrature. As a result, the second coarse sensor winding will be sensitive to magnetic fields which vary as cos θ, cos 2θ, cos 3θ, cos 4θ etc. As mentioned above, the coarse sensor windings each have two turns of conductor. The reason for this will now be explained. The coarse sensor windings should not interfere with the performance of the fine sensor windings. One aspect of this requirement is that the coarse sensor windings should not disturb the magnetic field generated by the excitation winding in such a way as to generate an offset EMF in the fine sensor windings 51 and 53. Such an offset could be caused by eddy currents flowing in the copper of the coarse sensor winding conductors induced by the excitation magnetic field. In this embodiment, a single turn of coarse sensor winding would cause appreciable offsets in the fine sensor windings, since positive and negative loops of the fine sensor windings would contain dissimilar coarse conductor patterns (averaged over all the periods of the fine sensor windings). However, if the coarse sensor winding pattern is repeated twice, with a repeat angle of 22.5° (corresponding to half a period of the fine sensor windings) or any odd multiple of 22.5°, then this offset effect will be eliminated, since the effect of each coarse sensor winding will be equal and opposite in the loops of the fine sensor windings. The second turn of conductor used for each of the coarse sensor windings also helps to increase accuracy, due to increased spatial averaging and increased overall signal levels which are induced in the coarse sensor windings. It should, however, be noted that if the fine sensor windings have an odd number of periods around the circuit board 41, then there will not be an appreciable offset if the coarse sensor windings have only a single turn, since the 90° circumferential spacing of the second coarse sensor winding ensures that the effect of one coarse sensor winding on each fine sensor winding will be equal and opposite to the effect of the other coarse sensor winding on each fine sensor winding.

In this embodiment, however, the repeat angle between the two turns of each coarse sensor winding is 56.25°. This angle was chosen because it reduces the coarse sensor winding's sensitivity to magnetic fields which vary as sin 3θ. Although this repeat angle is not ideal for reducing the offset caused by eddy currents flowing in the coarse sensor windings, it does alleviate the problem to a certain extent.

Figure 7G:
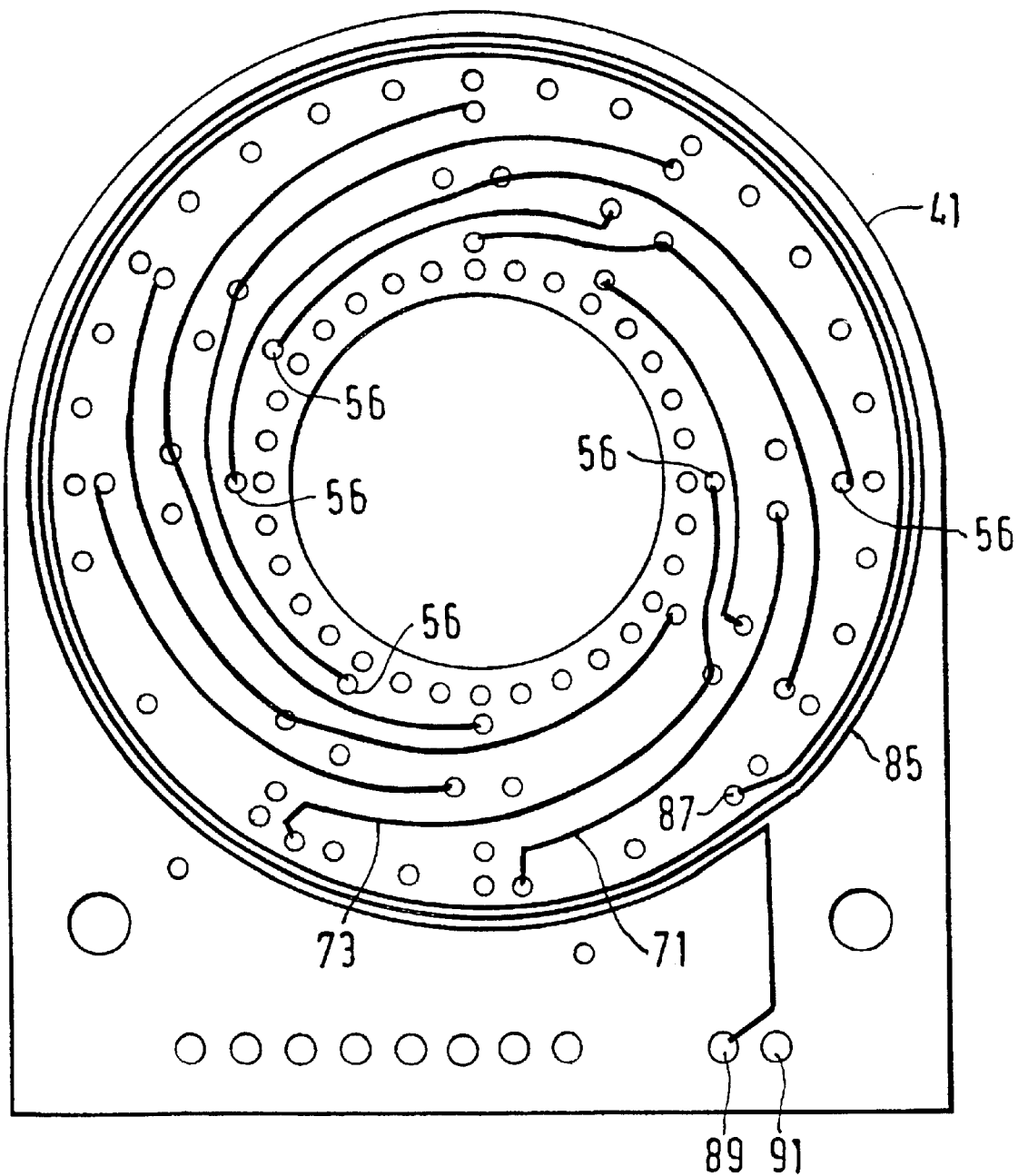
FIG. 7g shows a fourth layer of printed conductors which form part of the coarse sensor windings and an excitation winding on the sensor printed circuit board.
Figure 7H:
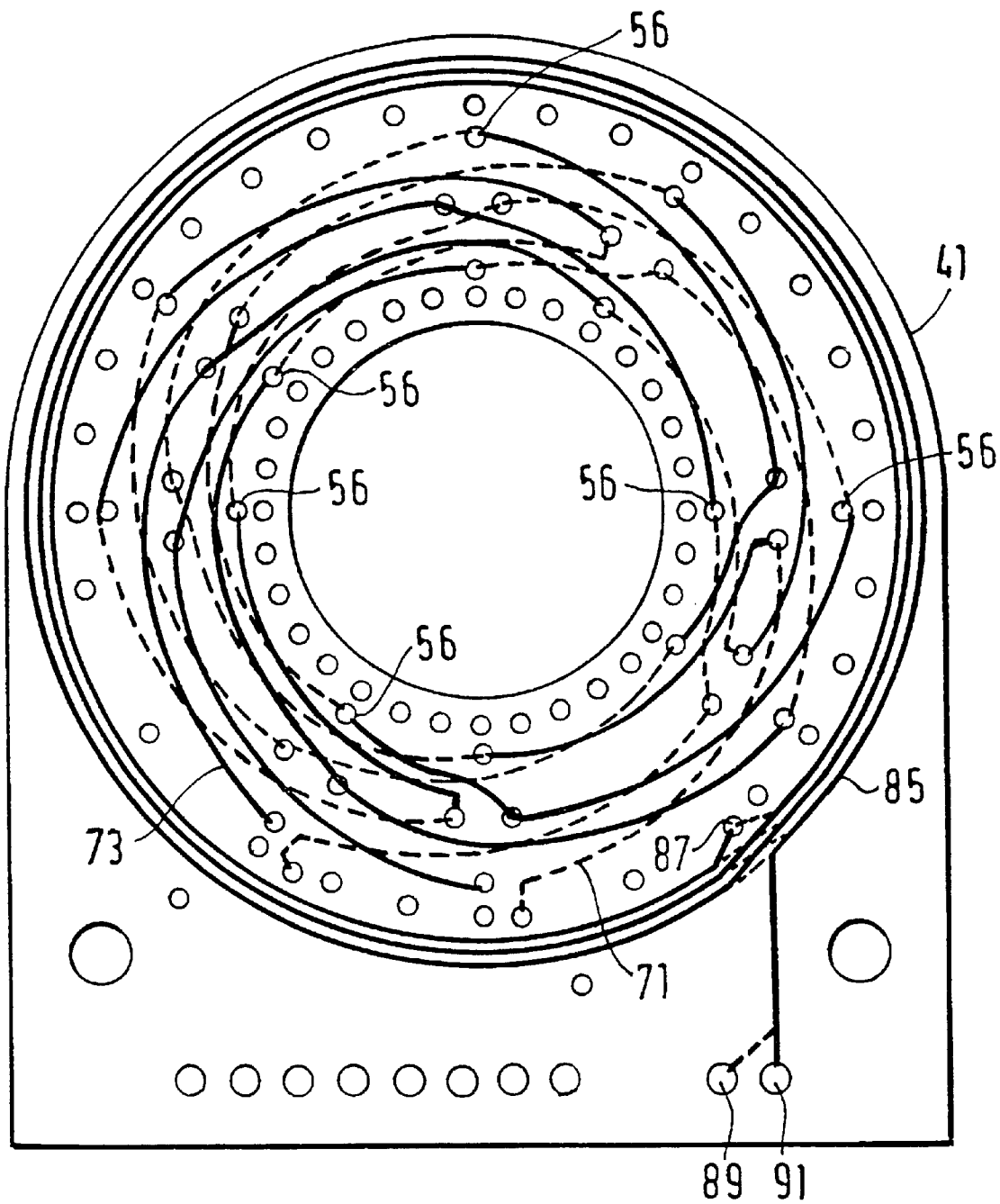
FIG. 7h shows the resulting pair of quadrature coarse sensor windings and an excitation winding formed by superimposing the layers of printed conductors shown in FIGS. 7f and 7g.

FIGS. 7f and 7g show (as viewed from the first layer of the sensor circuit board 41 shown in FIG. 7b) the third and fourth conductor layers of the circuit board 41, which carry most of the conductors for the coarse sensor windings 71 and 73; and FIG. 7h shows the resulting two coarse sensor windings 71 and 73 which are formed when the conductor layers shown in FIGS. 7f and 7g are superimposed over each other and connected at the via holes, some of which are labelled 56. As shown in FIGS. 7b and 7c, the ends (at vias 72 and 74) of the coarse sensor winding 71 are connected to a pair of connection pads 75 and 77 and the ends (at vias 76 and 78) of coarse sensor winding 73 are connected to a pair of connection pads 79 and 81. The connection tracks used to connect the coarse sensor windings to the connection pads follow each other on the first and second layers of the circuit board 41, thereby minimising any magnetic coupling between the connection tracks and the resonator. These connection tracks are provided on the first and second layers rather than on the third and fourth layers since, as shown in FIGS. 7f and 7g, the third and fourth layers of the circuit board 41 carry the excitation winding 85 which extends circumferentially around the sensor board 41. As shown, the ends of the excitation winding 85 are connected to a pair of connection pads 89 and 91 by connection tracks which follow each other on the third and fourth layers of the circuit board 41. As shown, in this embodiment, the excitation winding 85 is formed by three turns of conductor on each of the third and fourth layers which are connected together at the via 87. As a result of the uniform nature of the excitation winding 85, when an excitation current is applied to the excitation winding, a uniform magnetic field will be generated in the vicinity of the sensor circuit board 41.

RESONATOR

As mentioned above, the circuit board 37 carries a resonator as a magnetic field generator. This resonator is formed by a shaped inductor winding having a capacitor connected across the ends of the inductor winding. In this embodiment, the inductor winding of the resonator has two portions, a first portion which is operable to generate a magnetic field which includes a component which spatially varies as sin θ (for coupling with the coarse sensor windings 71 and 73) and a second portion which is operable to generate a magnetic field which includes a component which spatially varies as sin(8θ) (for coupling with the fine sensor windings 51 and 53).

FIGS. 8a and 8b respectively show the conductor patterns which form these first and second portions of the resonator coil. Referring to FIG. 8a, the first portion, generally indicated by reference numeral 92, has eight conductor loops 92a to 92h of varying width which are connected together in series via the via holes 93 and the conductor tracks of the second portion shown in FIG. 8b, so that current flows around each loop in the same direction except for loop 92g in which the current flows in the opposite direction. FIG. 8b shows the conductor tracks of the second portion of the resonator coil as it would be seen from the side of the circuit board 37 shown in FIG. 8a. As shown, the second portion 94 comprises eight spiral-shaped windings 94a to 94h which are connected together in series via the via holes 93 and the loops 92a to 92h of the first portion 92 shown in FIG. 8a. The connections are arranged so that a current will flow in the same direction around each of the eight spiral windings 94a to 94h (which is the same as the direction of current flow around most of the loops in the first portion 92). FIG. 8a also shows the two ends 95a and 95b of the resonator coil between which one or more capacitors (not shown) can be attached. In this embodiment, up to three surface mount capacitors (not shown) can be connected in parallel between the ends 95a and 95b. Ideally, only one capacitor is needed, but other spaces are provided for additional capacitors for tuning purposes.

Figure 9A:
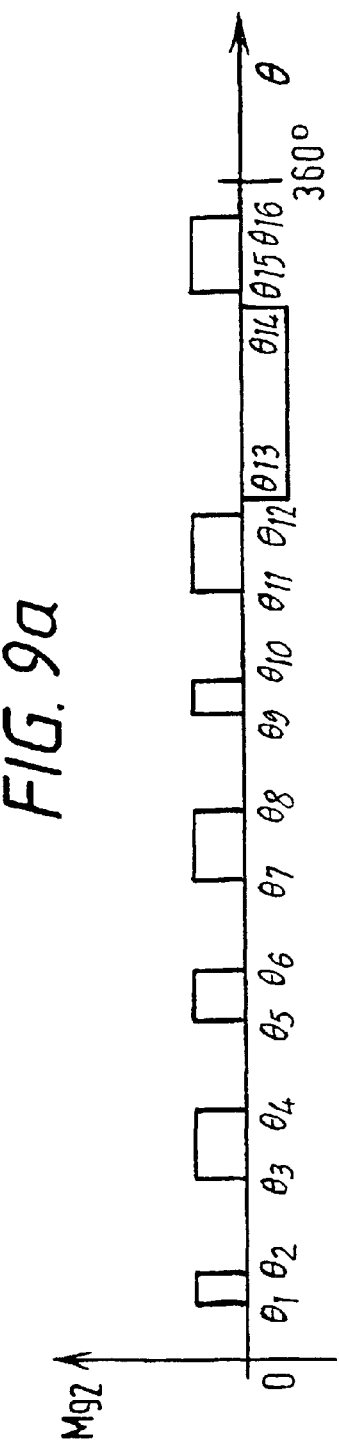
FIG. 9a is a plot illustrating the way in which the magnetisation of the first portion of the resonator coil shown in FIG. 8a varies around the resonator printed circuit board, when a constant current is applied to the resonator coil.

In order to determine what magnetic fields will couple into the resonator coil and to determine what magnetic fields will be generated by the resonator coil, the magnetisation/sensitivity plot for the two resonator coil portions 92 and 94 must be considered. FIG. 9a shows the magnetization plot ($M_{92}$) for the first portion 92 of the resonator coil, around a circular path which passes through the centre of the loops 92a to 92h, when a constant current is flowing in the resonator. A Fourier analysis of this magnetization plot reveals that it has a DC component (which means that it will be sensitive to and will generate a magnetic field which does not spatially vary, i.e. one which is uniform over the measurement area), a fundamental component which varies as sin θ and a harmonic component which varies as sin(8θ). It does not, however, include (to any significant level) components which vary as sin(6θ), sin(7θ), sin(9θ) or sin (10θ). This has been achieved by the particular placement of the radial wires of the loops 92a to 92h. Since there are 16 angles $\theta_1$ to $\theta_{16}$ which can be varied in order to change the harmonic content of the magnetic field generated by the first portion, this allows up to 16 harmonic components to be eliminated from the magnetization plot. To eliminate the $m^{th}$ harmonic involves solving the following equation:

$$\int_0^{2\pi} M_{92}(\theta)\sin(m\theta)\,d\theta \qquad (5)$$

where $M_{92}(\theta)$ is the magnetization plot shown in FIG. 9a. This reduces to:

$$\frac{1}{m}[\cos(m\theta_1) - \cos(m\theta_2) + \cos(m\theta_3) - \cos(m\theta_4) + \cdots] = 0 \qquad (6)$$

which is an equation in terms of the 16 unknown angles $\theta_i$. There will be many solutions to the equations which eliminate the desired harmonics and the solution which is the easiest to implement on the printed circuit board should be chosen.

Figure 9B:
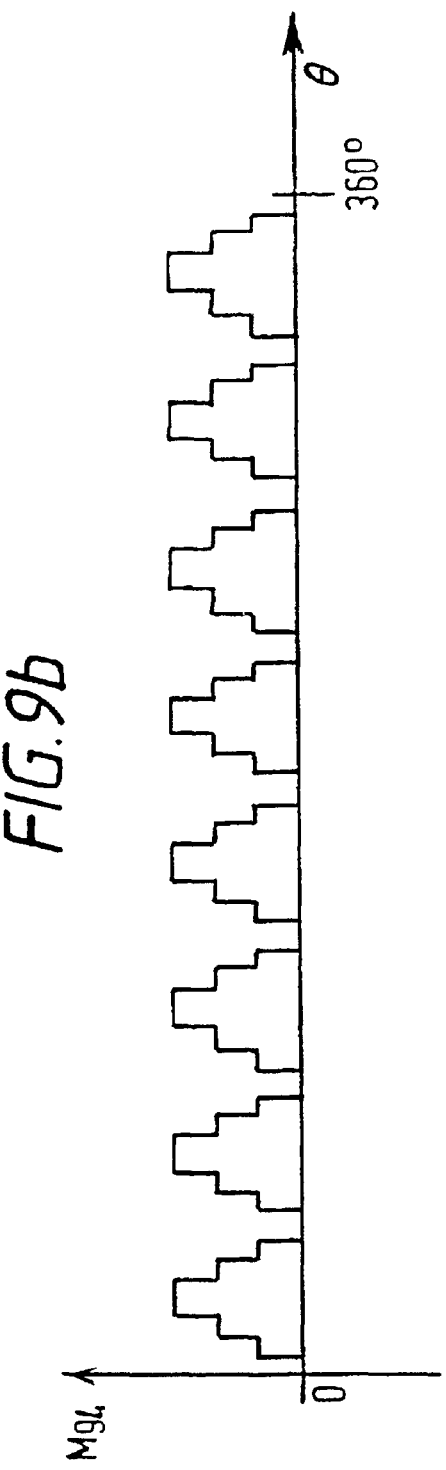
FIG. 9b is a plot illustrating the way in which the magnetisation of the second portion of the resonator coil shown in FIG. 8b varies around the resonator printed circuit board, when a constant current is applied to the resonator coil.

FIG. 9b shows the magnetization plot ($M_{94}$) for the second portion 94 of the resonator inductor winding, when a constant current is flowing in the resonator coil. A Fourier analysis of this magnetization plot reveals that it has a DC component, a component which varies as sin(8θ), a component which varies as sin(40θ), a component which varies as sin(56θ) etc. There is, however, no component (or at least a very small amount of the component) which varies as sin(24θ) because of the spacing of the radial wires of the loops 94a to 94h.

As will be explained below, the transducer formed by the sensor windings, excitation winding and the resonator described above with reference to FIGS. 7 and 8 can be used, with appropriate excitation and processing circuitry, to determine the absolute position of the rotatable shaft 31 through 360° of rotation, and which is less sensitive to errors caused by, for example, the misalignment of the resonator printed circuit board 37 relative to the sensor printed circuit board 41.

Figure 10:
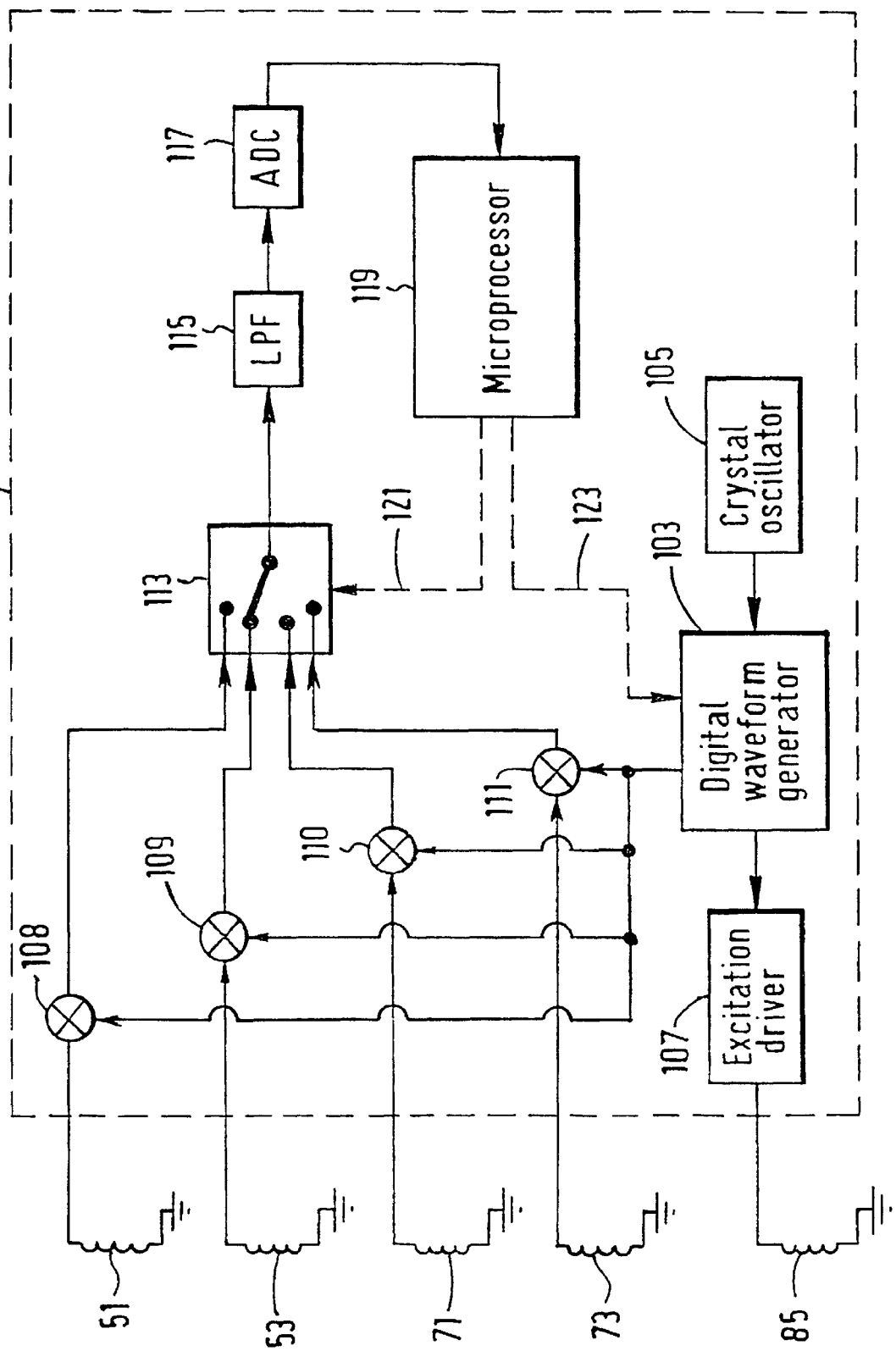
FIG. 10 is a schematic representation of excitation and processing circuitry used to energise the excitation winding shown in FIG. 7h and to process the signals received in the sensor windings shown in FIG. 7d.

The operation of the transducer and of the excitation and the processing circuitry used with the transducer will now be described in more detail with reference to FIG. 10. In particular, FIG. 10 shows the excitation and processing circuitry 101 used to energise the excitation winding 85 and to process the signals which are induced in the sensor windings 51, 53, 71 and 73. In this embodiment, the excitation and processing circuitry 101 is mounted on the sensor circuit board 41 and is connected to the excitation winding 85 at the connection pads 89 and 91; is connected to the fine sensor windings 51 and 53 at connection pads 61 and 63 and 65 and 67 respectively; and is connected to the coarse sensor windings 71 and 73 at connection pads 75 and 77 and 79 and 81 respectively.

As shown, the excitation and processing circuitry 101 comprises a digital waveform generator 103 which is operable to receive an oscillating input from a crystal oscillator 105 and to output the excitation signal which is applied to the excitation winding 85 via an excitation driver 107. In this embodiment, the excitation signal is a square wave voltage having a fundamental frequency $F_0$ of 1 MHz, which is matched to the resonant frequency of the resonator mounted on the resonator circuit board 37. The excitation current flowing on the excitation winding 85 generates a corresponding uniform electromagnetic field in the vicinity of the resonator circuit board 37. Since the magnetisation plot of the first and second portions 92 and 94 of the resonator coil have a DC component, this excitation magnetic field will couple with the resonator coil and causes the resonator to resonate and a current to flow through the resonator coil portions 92 and 94. As a result, the resonator generates its own spatially varying magnetic field in the vicinity of the sensor circuit board 41. In particular, resonator coil portion 92 will generate a magnetic field having a component which spatially varies as sin θ and a component which spatially varies as sin(8θ) and resonator coil portion 94 will generate a magnetic field having a component which spatially varies as sin(8θ), a component which spatially varies as sin(40θ) etc.

As mentioned above, the fine sensor windings 51 and 53 are sensitive to magnetic fields which vary as sin(8θ), sin(24θ), sin(40θ) etc. Therefore, the component of the magnetic field generated by both resonator coil portions 92 and 94 which varies as sin(8θ) will couple with the sin(8θ) sensitivity component of the fine sensor windings 51 and 53. The harmonic component sin(40θ) generated by the resonator coil portion 94 will couple with the sin(40θ) sensitivity component of the fine sensor windings 51 and 53. However, since the sin(40θ) component will fall off rapidly with distance from the resonator circuit board 37 and since the fine sensor winding's sensitivity to this component will be at least ⅕ the sensitivity of the fundamental component, it causes negligible distortion to the signal induced in the sensor windings by the magnetic field component which varies as sin(8θ). In a similar manner, the component of the resonator magnetic field which varies as sin θ (generated by the resonator coil portion 92), will couple with the sin θ sensitivity component of the coarse sensor windings 71 and 73. Since the coarse sensor windings are not highly symmetric, the component of the resonator magnetic field which varies as sin(8θ) will couple with the sin 8θ sensitivity component of the coarse sensor windings 71 and 73. However, this not critical, since the coarse sensor windings 71 and 73 only have to be accurate enough to ⅟₃₂ of a revolution and any distortion caused by the eighth or higher harmonics will be insignificant at this degree of accuracy.

The EMFs induced in the sensor windings 51, 53, 71 and 73 are then passed through a respective mixer circuit 108 to 111 where the EMFs are demodulated (in order to remove the time varying component of the induced EMFS) by multiplying them with a 90° phase shifted version of the excitation signal which was applied to the excitation winding 85. As shown, these mixing signals are generated by the digital waveform generator 103. The 90° phase shift in the mixing signal is required due to the effect of the resonator when it resonates. The outputs from the mixers 108 to 111 will each comprise a DC component which depends upon the angular position of the resonator circuit board 37, together with high frequency time varying components. The outputs from the mixers are then fed, one after the other, through switch 113 to a low pass filter 115 which removes these high frequency time varying components. The resulting DC level is then converted into a digital value by the analogue-to-digital converter 117 and passed to the microcontroller 119. The microcontroller then determines the rotational angle of the resonator circuit board 37 by using an arc-tangent function on the digital values from the fine sensor windings 51 and 53 and uses the digital values received from the coarse sensor windings 71 and 73 to resolve the period ambiguity problem with the fine sensor windings. As represented by the dashed lines 121 and 123, the microprocessor 119 also controls the switching of the switch 113 and the signals generated by the digital waveform generator 103.

A brief overview has been given of the excitation and processing circuitry employed in the present embodiment. A more detailed explanation can be found in, for example, the applicant's earlier international application WO95/31696, the contents of which are incorporated herein by reference. An alternative processing circuitry which does not use an arc-tangent function and which can be used to process the signals received from the sensor windings is described in the applicant's earlier international application WO98/00921 and in international application PCT/GB98/03910, the contents of which are incorporated herein by reference.

As those skilled in the art will appreciate, the reason why the transducer formed by the sensor circuit board 41 and the resonator circuit board 37 is less sensitive to effects such as misalignments and tilts is because the resonator coil has been shaped so that it does not generate the spatially varying magnetic fields (in this embodiment components $\sin(6\theta)$, $\sin(7\theta)$, $\sin(9\theta)$ or $\sin(10\theta)$) which would introduce the most distortion into the fine position measurements when there is a tilt or offset. In particular, if the resonator board 37 is tilted relative to the sensor board 41 (so that they do not lie in planes which are exactly parallel), then any $\sin(6\theta)$ component and any $\sin(10\theta)$ component will cause a distortion in the signals induced in the fine sensor windings, which varies as $\alpha_2$ and any $\sin(7\theta)$ component and any $\sin(9\theta)$ component will cause a distortion in the signals induced in the fine sensor windings, which varies linearly with $\alpha$. However, since the resonator coil has been shaped so as not to generate these components (or to generate them to a negligible extent), the only distortions will be caused by components which vary as $\alpha^3$ (or higher), and these distortions can be ignored for small values of misalignments and tilts.

It should, however, be noted that distortions will occur to the signals induced in the coarse sensor windings 71 and 73 by such a tilt or offset due to the distortion of the DC component of the magnetic field generated by the resonator. However, this is not important, since the accuracy of the position sensor is not dependent on the signals from the coarse sensor windings. These signals are only used to resolve the phase ambiguity of the measurements from the fine sensor windings.

The effects of these distortions can be seen more clearly from the following tables. The first one (Table 1) shows the magnetic field components generated by the resonator coil portions 92 and 94 when there is no distortion together with some of the additional components which are generated when there is a distortion. The second table (Table 2) shows the components which the fine and coarse sensor windings are sensitive to.

TABLE 1

| | No distortion components | Generated components which linearly vary with distortion | Generated components which vary with square of distortion |
|---|---|---|---|
| Resonator coil portion 92 | DC<br>Sinθ<br>Sin8θ | Sinθ<br>DC, Sin2θ<br>Sin7θ, Sin9θ | Sin2θ<br>Sin3θ<br>Sin6θ, Sin10θ |
| Resonator coil portion 94 | DC<br>Sin8θ<br>Sin40θ<br>Sin56θ | Sinθ<br>Sin7θ, Sin9θ<br>Sin39θ, Sin41θ<br>Sin55θ, Sin57θ | Sin2θ<br>Sin6θ, Sin10θ<br>Sin38θ, Sin42θ<br>Sin54θ, Sin58θ |

TABLE 2

| | Fundamental | 1st Harmonic Component | 2nd Harmonic Component |
|---|---|---|---|
| Fine sensor windings 51 & 53 | Sin8θ | Sin24θ | Sin40θ |
| Coarse sensor windings 71 & 73 | Sinθ | Sin2θ | Sin3θ |

As can be seen from a comparison of the components in the second and third column of the first table with the components in the second table, any misalignment of the resonator and the sensor windings only affects the signals in the coarse sensor windings, which is not critical to the design.

MODIFICATIONS AND ALTERNATIVE EMBODIMENTS

In the above embodiments, fine sensor windings are provided which have eight periods around the sensor circuit board 41. As those skilled in the art will appreciate, this is not essential. The fine sensor windings may have any number of periods, although as the number of periods increases, the space on the circuit board 37 decreases. There is therefore a compromise between the size of the printed circuit board used and the number of periods of the fine sensor winding (and hence accuracy of the sensor winding). Additionally, as those skilled in the art will appreciate, it is not essential for the coarse sensor windings to have only a single period around the sensor board. In an embodiment where the coarse sensor windings have plural periods around the sensor board, then a Vernier type calculation can be performed in order to resolve the phase ambiguity problem. However, this increases the calculations which have to be performed by the processing circuitry and is therefore not a preferred embodiment. Additionally, in such an embodiment, it may be more difficult to ensure that any distortions do not corrupt the signals in the fine sensor windings.

In the above embodiment, the resonator was energised by passing a current through excitation winding 85 and the rotational angle of the resonator board (and hence of the rotatable shaft 31) was determined from signals induced in the sensor windings 51, 53, 71 and 73. As those skilled in the art will appreciate, because of the general reciprocal nature of such inductive position sensors, it would be possible to energise the resonator circuit by applying excitation signals to the sensor windings 51, 53, 71 and 73 and to determine the angular position of the resonator board 37 from the signals induced in the excitation winding 85. In such an embodiment, each of the sensor windings 51, 53, 71 and 73 may be excited in turn. Alternatively different frequencies of excitation signals could be used, in which case the signals induced in the excitation winding could be processed simultaneously. Alternatively still, the resonator could be energised by applying excitation signals to the coarse sensor windings 71 and 73 with the signals received on the fine sensor windings 51 and 53 being used to determine the angular position of the resonator board 37. The applicant's earlier International application WO98/58237, the content of which is incorporated herein by reference, discloses a linear position sensor which operates in a similar manner.

In the above embodiment, the first resonator coil portion 92 comprised eight loop portions. As those skilled in the art will appreciate, this is not essential. Eight loop portions were used since this provides a high eighth harmonic component (for coupling with the fine sensor windings 51 and 53) in the magnetic field generated by this portion of the resonator coil.

In the above embodiment, an electrical resonator was used having a spatially shaped inductor coil to generate the spatially varying magnetic field. As those skilled in the art will appreciate, other types of magnetic field generator can be used to generate the spatially varying magnetic fields discussed above. For example, rather than connecting a capacitor across the ends 95a and 95b of the resonator coil portions 92 and 94, the ends could simply be short-circuited together. However, the use of the resonant circuit is preferred since it provides larger signal levels and can be used in a pulse-echo mode of operation, in which a burst of excitation current is applied to the excitation winding and then after the burst is ended, the signals induced in the sensor windings are processed. The magnetic field generator could also be formed from a layer of magnetisable material in which a spatially varying magnetisation pattern has been formed. However, this is not preferred, since it cannot determine the angular position when the system is at rest and requires complex and expensive sensor elements, e.g. Hall effect or magnetostrictive sensors for sensing the angular position.

Alternatively still, the magnetic field generator may be provided by a shaped winding, such as those shown in FIG. 8, with the ends of the windings connected to a power source. Such an embodiment would not, therefore, need the excitation winding shown in FIG. 7h. However, this embodiment is not preferred, because it would require power to be provided to the rotating member. In this embodiment, however, the magnetic field coil portions can be made so that they do not generate any spatial DC component. For example, the coil portion 94 could be adapted to have sixteen spiral loop portions, with adjacent loop portions being wound in the opposite sense. This is advantageous because it reduces the system's sensitivity to electromagnetic interference.

In the above embodiment, the resonator on the resonator circuit board 37 was formed by an inductor coil (92 and 94) and a capacitor. In addition to or instead of the capacitor, a ceramic-type resonator may be connected between the ends (95a and 95b) of the resonator coil. Such an embodiment has the advantage of increasing the Q factor of the resonant circuit.

In the above embodiments, the sensor windings, excitation windings and the resonator windings were formed on layers of a printed circuit board. A similar position sensor can be made with trick or thin film technologies, in which layers of conductive film are provided on a ceramic insulating substrate, with each conductive layer being separated by an insulating layer (which may be patterned so as to only insulate at the cross over points) to generate the set of excitation, sensor and resonator windings discussed above.

In the above embodiment, a separate mixer was provided for demodulating the signals from the respective sensor windings and the demodulated signals were then passed via a switch, to a common filter and analogue-to-digital converter and then to the microprocessor. In an alternative embodiment, separate filters and analogue-to-digital converters can be provided for the output of each of the mixers. Additionally, all of this circuitry could be implemented using a digital ASIC (application specific integrated circuit) which would reduce the overall cost and complexity of a design.

In the above embodiment, the shape of the resonator coil was arranged so as to eliminate certain harmonic components of the field which it generates, in order to reduce the sensitivity of the transducer to the effects of, for example, tilt and misalignment between the resonator circuit board 37 and the sensor circuit board 41. As those skilled in the art will appreciate, because of the reciprocal nature of this kind of position sensor, multi-turn sensor windings could also be used and the spacing between the turns of the sensor winding may be varied in order to eliminate the sensor windings sensitivity to certain harmonic components. However, this is not preferred, since multi-turn sensor windings add complexity to the sensor board and may result in the need for more conductor layers in the sensor board 41.

In the above embodiment, the resonator coil had first and second portions which were connected together in a single resonant circuit. As those skilled in the art will appreciate, the two coil portions do not have to be connected together. Instead, they may each be connected to a respective capacitor to form two separate resonant circuits, the resonant frequencies of which can be the same or different. In an embodiment where the resonator frequencies are different, one resonator would be provided for each of the fine and coarse sensor windings and the signals induced in the sensor windings would be synchronously detected in the same way as in the first embodiment, with the mixer frequency used for each sensor winding matching the resonant frequency of the corresponding resonator. Therefore, any component of the coarse resonator magnetic field which couples with the fine sensor windings will be eliminated by this process of synchronous detection, because it is at a different frequency. However, since most synchronous detection systems use square wave mixing using analogue switches (in order to reduce cost and enhance performance), the detectors will also be sensitive to odd multiples of their mixer frequencies. Therefore, in such an embodiment, the coarse resonant frequency should be chosen relative to the fine resonant frequency so that they are not related to these odd multiples of the mixer frequencies.

The resonant frequency of the coarse resonator would usually be chosen to be higher than the resonant frequency for the fine resonant circuit. This is because, at frequencies above resonance, the coarse resonant coil will appear as a short circuit since the impedance of the capacitor will become small. Currents will therefore be induced in the coarse resonator at such frequencies, although the phase will be shifted relative to the resonant phase and the effect can therefore be partially eliminated by synchronous detection at the resonant phase. If the resonant frequency of the coarse resonator is chosen to be higher than the resonant frequency of the fine resonator, then the coarse resonator will generate less of this "out of phase" field at the resonant frequency of the fine resonator, and performance will therefore be improved.

In the above embodiments, phase quadrature sensor windings were used. As those skilled in the art will appreciate, this is not essential. Absolute position can be determined provided the second sensor winding is phase shifted relative to the first (although not a phase shift corresponding to 180°). However, such an embodiment is not preferred, since it complicates the processing required by the processing circuitry.

In the above embodiment, a resonator was rotatable relative to a fixed set of sensor windings and an excitation winding. As those skilled in the art will appreciate, the resonator circuit board could be fixed and the sensor circuit board could rotate with the rotatable shaft. In addition, they could both rotate relative to each other. However, these embodiments are not preferred because the excitation and processing circuitry would then need to be mounted on a moving member.

APPLICATIONS

The absolute 360° position sensor described above is well suited to motor encoding. It can provide the functionality of a resolver, without the size, speed and cost disadvantages. It can provide the functionality of an optical encoder without the size, cost and fragility, and with the additional benefit of absolute position indication. It can also perform motor commutation, by indicating angles at which phase currents applied to the motor coils should be switched.

The sensors described above can be made on a printed circuit board which can be integrated into a motor as part of an electronic drive system, also comprising control electronics and power switching devices.

Where a motor is used to drive machinery etc, there is often a gearbox and pulley/lead screw arrangement which gears down the motor's output. In this case it is often advantageous to determine the position of the output of such drive without a position sensor at the final drive output. This approach simplifies the system and exposes fewer parts to damage. A common approach is to attach a multi-turn encoder to the drive motor. The number of turns is chosen to be less than the maximum number of turns of the final gear system so that the multi-turn encoder's output is representative of the absolute position of the gear system.

A multi-turn system can be made in a number of ways, using a 360° encoder as described above. The motor shaft's output can be geared down such that the output of such gearing is less than 360°, and the output could then be measured with the 360° encoder. This approach suffers from gearbox accuracy limitations, including backlash. An alternative approach is to use this approach in conjunction with an encoder on the motor shaft as well. An accurate position indication can then be derived from the direct encoder, and the absolute position can be derived from the geared encoder. The gearbox and position encoder should have sufficient accuracy to tell which turn the motor shaft is at, otherwise intermediate encoders may be necessary. This approach can be simplified by using a single sensor printed circuit board to measure both the motor shaft directly and the geared output(s) as well. This can be achieved by using different resonator frequencies for each of the different sensed parts.

The rotary sensor described above can also be used to sense the rotary position of the camshaft and/or crankshaft of an engine. The sensors may be placed at the end of either shaft or at any other convenient location. Further, if the drive between the crankshaft and the camshaft is sufficiently tight, then the crankshaft motion may be determined from the motion of the camshaft. In this case, a sensor on the camshaft alone may be sufficient.

The rotary position sensor described above can also be used as a versatile general purpose position transducer. For example, a single transducer can be configured to measure any angle up to 360° without any changes to the processing electronics, although with some possible changes to the software. This means that a programmable position sensor can be manufactured in large volumes and customised for specific customer needs at a later point.

What is claimed is:

1. A rotary position detector, comprising:
   first and second members, at least one of which is rotatable relative to the other about an axis of rotation;
   said first member comprising:
   (a) a first magnetic field generator for generating a magnetic field which spatially varies around said axis of rotation in a cyclic manner with an angular frequency of M; and
   (b) a second magnetic field generator comprising a winding which is wound around said axis of rotation and which has a plurality of loop portions circumferentially spaced around said axis of rotation, for generating a magnetic field which spatially varies around said axis of rotation in a cyclic manner and which comprises a fundamental component with an angular frequency of N and harmonic components thereof,
   wherein N<M and wherein the circumferential spacing between said loop portions is arranged so as to reduce the amount of predetermined ones of the harmonic components generated by said second magnetic field generator;
   said second member comprising:
   (a) a first sensor which is sensitive to magnetic fields which spatially vary around said axis of rotation in a cyclic manner and with an angular frequency of M; and
   (b) a second sensor which is sensitive to magnetic fields which spatially vary around said axis of rotation in a cyclic manner and with an angular frequency of N;
   whereby, in response to a magnetic field being generated by said first and second magnetic field generators, first and second signals are generated by said first and second sensors respectively, which signals vary with the relative angular position of said first and second members; and
   means for determining the relative angular position of said first and second members from said first and second signals.

2. A detector according to claim 1, wherein the circumferential spacing between said loop portions is arranged so as to reduce the amount of the harmonic components generated by said second magnetic field generator which have an angular frequency of M±1.

3. A detector according to claim 1, wherein the circumferential spacing between said loop portions is arranged so as to try to eliminate the harmonic components generated by said second magnetic field generator which have an angular frequency of M±1.

4. A detector according to claim 1, wherein the circumferential spacing between said loop portions is arranged so as to try to eliminate the harmonic components generated by said second magnetic field generator which have an angular frequency of M±2.

5. A detector according to claim 1, wherein said second magnetic field generator is operable to generate said magnetic field by passing a current through said winding.

6. A detector according to claim 5, wherein said second magnetic field generator further comprises a power source for generating said current.

7. A detector according to claim 1, wherein said first magnetic field generator comprises a winding which is wound around said axis of rotation and which has a plurality of loop portions circumferentially spaced around said axis of rotation, for generating a magnetic field which spatially varies around said axis of rotation in a cyclic manner and which comprises a fundamental component with an angular frequency of M and some harmonic components thereof.

8. A detector according to claim 7, wherein said first magnetic field generator is operable to generate said magnetic field by passing a current through said winding.

9. A detector according to claim 8, wherein said first magnetic field generator further comprises a power source for generating said current.

10. A detector according to claim 7, wherein the ends of each winding are connected together through a respective capacitor, so that each magnetic field generator comprises a respective resonator.

11. A detector according to claim 10, wherein the resonant frequency the first magnetic field generator is different to the resonant frequency of the second magnetic field generator.

12. A detector according to claim 11, wherein the resonant frequency of said first magnetic field generator is lower than the resonant frequency of the second magnetic field generator.

13. A detector according to claim 7, wherein the winding of said first magnetic field generator is electrically connected to the winding of said second magnetic field generator.

14. A detector according to claim 13, wherein adjacent loops of said second magnetic field generator are electrically connected through the loops of the first magnetic field generator and vice versa.

15. A detector according to claim 13, wherein the ends of said windings are connected together through a capacitor, to form a resonator.

16. A detector according to claim 13, wherein the ends of said windings are connected together to form a short circuit coil.

17. A detector according to claim 15, further comprising means for energising said short circuit coil or said resonator to cause said current to flow through said winding.

18. A detector according to claim 17, wherein said second member comprises said energising means.

19. A detector according to claim 18, wherein said energising means comprises a winding which is circumferentially wound around said axis of rotation.

20. A detector according to claim 7, wherein said windings are located on but electrically separate from each other.

21. A detector according to claim 7, wherein said windings are formed from at least two layers of conductor tracks which are connected together at a plurality of vias which pass through an insulating layer disposed between said at least two layers of conductor tracks.

22. A detector according to claim 21, wherein said windings are formed from conductor tracks on at least two layers of a printed circuit board.

23. A detector according to claim 7, wherein said loop portions of said windings lie in one or more planes which are substantially parallel to said axis of rotation.

24. A detector according to claim 7, wherein said loop portions of said first magnetic field generator are symmetrically spaced around said axis of rotation.

25. A detector according to claim 24, wherein each of said loop portions of said first magnetic field generator comprises a multi turn spiral conductor.

26. A detector according to claim 24, wherein each of said loop portions of said first magnetic field generator have substantially the same form.

27. A detector according to claim 7, wherein the loop portions of said first magnetic field generator are wound in the same sense.

28. A detector according to any of claim 7, wherein said first magnetic field generator comprises M loop portions.

29. A detector according to claim 1, wherein said loop portions of said second magnetic field generator enclose different areas.

30. A detector according to claim 1, wherein each loop portion comprises at least two substantially radial portions.

31. A detector according to claim 17, wherein the spacings between the substantially radial portions of the loops of said second magnetic field generator are not the same.

32. A detector according to claim 1, wherein at least one loop portion of said second magnetic field generator is wound in the opposite sense to the other loop portions of said second magnetic field generator.

33. A detector according to claim 1, wherein said second magnetic field generator is operable to generate a harmonic component which spatially varies around said axis of rotation with an angular frequency of M.

34. A detector according to claim 1, wherein said second magnetic field generator comprises M loop portions.

35. A detector according to claim 1, wherein said first sensor comprises a winding which is wound around said axis of rotation and which has a plurality of loop portions circumferentially spaced around said axis of rotation so as to be sensitive to a magnetic field which spatially varies around said axis of rotation in a cyclic manner with an angular frequency of M.

36. A detector according to claim 35, wherein said first sensor further comprises a second winding which is wound around said axis of rotation and which has a plurality of loop portions circumferentially spaced around said axis of rotation so as to be sensitive to a magnetic field which spatially varies around said axis of rotation in a cyclic manner with an angular frequency of M;

wherein the loop portions of the respective windings are circumferentially spaced apart;

wherein said first sensor is operable to generate two signals in response to said first magnetic field generator generating a magnetic field, one from each of said first sensor windings; and wherein said determining means is operable to determine a fine position measurement from said two signals from said first sensor.

37. A detector according to claim 36, wherein the circumferential spacing between the two windings of said first sensor is $\pi/2M$ or an integer multiple thereof, so that said two signals are in phase quadrature.

38. A detector according to claim 36, wherein said determining means is operable to determine said fine position measurement using a trigonometric relationship between said two signals.

39. A detector according to claim 35, wherein the or each first sensor winding comprises 2M loop portions arranged in succession around said axis of rotation, each loop extending circumferentially around said axis of rotation and said loops being arranged so that EMFs induced in adjacent loops by a common alternating magnetic field oppose each other.

40. A detector according to claim 1, wherein said second sensor comprises a winding which is wound around said axis of rotation and which has a plurality of loop portions circumferentially spaced around said axis of rotation so as to be sensitive to a magnetic field which spatially varies around said axis of rotation in a cyclic manner with an angular frequency of N.

41. A detector according to claim 40, wherein said second sensor further comprises a second winding which is wound around said axis of rotation and which has a plurality of loop portions circumferentially spaced around said axis of rotation so as to be sensitive to a magnetic field which spatially varies around said axis of rotation in a cyclic manner with an angular frequency of N;
   wherein the loop portions of the respective windings are circumferentially spaced apart;
   wherein said second sensor is operable to generate two signals in response to said second magnetic field generator generating a magnetic field, one from each of said first sensor windings; and
   wherein said determining means is operable to determine a coarse position measurement from said two signals from said second sensor.

42. A detector according to claim 41, wherein the circumferential spacing between the two windings of said first sensor is π/2N or an integer multiple thereof, so that said two signals are in phase quadrature.

43. A detector according to claim 41, wherein said determining means is operable to determine said fine position measurement using a trigonometric relationship between said two signals.

44. A detector according to claim 40, wherein the or each second sensor winding comprises 2N loop portions arranged in succession around said axis of rotation, each loop extending circumferentially around said axis of rotation and said loops being arranged so that EMFs induced in adjacent loops by a common alternating magnetic field oppose each other.

45. A detector according to claim 40, wherein said first sensor comprises a winding which is wound around said axis of rotation and which has a plurality of loop potions circumferentially spaced around said axis of rotation so as to be sensitive to a magnetic field which spatially varies around said axis of rotation in a cyclic manner with an angular frequency of M and wherein said sensor windings are formed on but electrically spaced from each other.

46. A detector according to claim 45, wherein said sensor windings are formed from at least two layers of conductor tracks which are connected together at a plurality of vias which pass through an insulating layer disposed between said at least two layers of conductor tracks.

47. A detector according to claim 46, wherein said windings are formed from conductor tracks on a multi-layer printed circuit board.

48. A detector according to claim 47, wherein said sensor windings lie in one or more planes which are substantially parallel to said axis of rotation.

49. A detector according to claim 47, wherein the conductor tracks for the windings of said first sensor are located in the layer which is closest to said magnetic field generators.

50. A detector according claim 1, wherein N equals one.

51. A detector according to claim 1, wherein M equals eight.

52. A detector according to claim 1, wherein said first and second magnetic field generators are passive and wherein said second member further comprises means for energising said magnetic field generators.

53. A detector according to claim 50, wherein said energising means is operable to apply a pule of driving signal during a first time interval and wherein said determining means is operable to process said sensor signals during a subsequent second time interval.

54. A detector according to claim 51, wherein said determining means comprises a synchronous detector for demodulating the signals received from said first and second sensors.

55. A rotary position detector, comprising:
   first and second members, at least one of which is rotatable relative to the other about an axis of rotation;
   said first member comprising:
      (a) a first magnetic field generator for generating a magnetic field which spatially varies around said axis of rotation in a cyclic manner with an angular frequency of M; and
      (b) a second magnetic field generator comprising a winding which is wound around said axis of rotation and which has a plurality of loop portions circumferentially spaced around said axis of rotation, for generating a magnetic field which spatially varies around said axis of rotation in a cyclic manner and which comprises a fundamental component with an angular frequency of N and some harmonic components thereof,
         wherein N<M and wherein the circumferential spacing between said loop portions is arranged so as to try to eliminate predetermined ones of said harmonic components generated by said second magnetic field generator;
   said second member comprising:
      (a) a first sensor which is sensitive to magnetic fields which spatially vary around said axis of rotation in a cyclic manner and with an angular frequency of M; and
      (b) a second sensor which is sensitive to magnetic fields which spatially vary around said axis of rotation in a cyclic manner and with an angular frequency of N;
         whereby, in response to a magnetic field being generated by said first and second magnetic field generators, first and second signals are generated by said first and second sensors respectively, which signals vary with the relative angular position of said first and second members; and
      means for determining the relative angular position of said first and second members from said first and second signals.

56. A rotary position detector, comprising:
   first and second members, at least one of which is rotatable relative to the other about an axis of rotation;
   said first member comprising:
      (a) a first magnetic field generator for generating a magnetic field which spatially varies around said axis of rotation in a cyclic manner with an angular frequency of M; and
      (b) a second magnetic field generator comprising a winding which is wound around said axis of rotation and which has a plurality of loop portions circumferentially spaced around said axis of rotation, for generating a magnetic field which spatially varies around said axis of rotation in a cyclic manner and which comprises a fundamental component with an angular frequency of N and some harmonic components thereof,
         wherein N<M and wherein the circumferential spacing between said loop portions is arranged so as to reduce the amount of some of the harmonic components generated by said second magnetic field generator, relative to the amount of said harmonic components which exist in a corresponding square wave signal;

said second member comprising:
- (a) a first sensor which is sensitive to magnetic fields which spatially vary around said axis of rotation in a cyclic manner and with an angular frequency of M; and
- (b) a second sensor which is sensitive to magnetic fields which spatially vary around said axis of rotation in a cyclic manner and with an angular frequency of N;
  - whereby, in response to a magnetic field being generated by said first and second magnetic field generators, first and second signals are generated by said first and second sensors respectively, which signals vary with the relative angular position of said first and second members; and
  - means for determining the relative angular position of said first and second members from said first and second signals.

57. A rotary position detector, comprising:

first and second members, at least one of which is rotatable relative to the other about an axis of rotation;

said first member comprising:
- (a) a first magnetic field generator for generating a magnetic field which spatially varies around said axis of rotation in a cyclic manner with an angular frequency of M; and
- (b) a second magnetic field generator comprising a winding which is wound around said axis of rotation and which has a plurality of loop portions circumferentially spaced around said axis of rotation, for generating a magnetic field which spatially varies around said axis of rotation in a cyclic manner and which comprises a fundamental component with an angular frequency of N and some harmonic components thereof,
  - wherein N<M and wherein the circumferential spacing between said loop portions is arranged so as to reduce the amount of the harmonic components generated by said second magnetic field generator which have an angular frequency of M±1;

said second member comprising:
- (a) a first sensor which is sensitive to magnetic fields which spatially vary around said axis of rotation in a cyclic manner and with an angular frequency of M; and
- (b) a second sensor which is sensitive to magnetic fields which spatially vary around said axis of rotation in a cyclic manner and with an angular frequency of N;
  - whereby, in response to a magnetic field being generated by said first and second magnetic field generators, first and second signals are generated by said first and second sensors respectively, which signals vary with the relative angular position of said first and second members; and
  - means for determining the relative angular position of said first and second members from said first and second signals.

58. A rotary position detector, comprising:

first and second members, at least one of which is rotatable relative to the other about an axis of rotation;

said first member comprising:
- (a) a first magnetic field generator for generating a magnetic field which spatially varies around said axis of rotation in a cyclic manner with an angular frequency of M; and
- (b) a second magnetic field generator comprising a winding which is wound around said axis of rotation and which has a plurality of loop portions circumferentially spaced around said axis of rotation, for generating a magnetic field which spatially varies around said axis of rotation in a cyclic manner and which comprises a fundamental component with an angular frequency of N and some harmonic components thereof,
  - wherein N<M and wherein the circumferential spacing between said loop portions is arranged so as to eliminate the harmonic components generated by said second magnetic field generator which have an angular frequency of M±1;

said second member comprising:
- (a) a first sensor which is sensitive to magnetic fields which spatially vary around said axis of rotation in a cyclic manner and with an angular frequency of M; and
- (b) a second sensor which is sensitive to magnetic fields which spatially vary around said axis of rotation in a cyclic manner and with an angular frequency of N;
  - whereby, in response to a magnetic field being generated by said first and second magnetic field generators, first and second signals are generated by said first and second sensors respectively, which signals vary with the relative angular position of said first and second members; and
  - means for determining the relative angular position of said first and second members from said first and second signals.

59. A transducer for use in a position detector according to claim 1, comprising the first and second magnetic field generators and the first and second sensors.

60. A transducer for use in a rotary position detector, comprising:
- (a) a first magnetic field generator for generating a magnetic field which spatially varies around an axis in a cyclic manner with an angular frequency of M;
- (b) a second magnetic field generator comprising a winding which is wound around said axis and which has a plurality of loop portions circumferentially spaced around said axis of rotation, for generating a magnetic field which spatially varies around said axis in a cyclic manner and which comprises a fundamental component with an angular frequency of N and some harmonic components thereof,
  - wherein N<M and wherein the circumferential spacing between said loop portions is arranged so as to reduce the amount of some of the harmonic components generated by said second magnetic field generator;
- (c) a first sensor which is sensitive to magnetic fields which spatially vary around said axis in a cyclic manner and with an angular frequency of M; and
- (d) a second sensor which is sensitive to magnetic fields which spatially vary around said axis in a cyclic manner and with an angular frequency of N.

61. A transducer for use in a rotary position detector, comprising:

a first circuit board comprising at least two layers of conductor tracks which are connected together at a plurality of vias to form:
- (a) a first winding which, when energised, is operable for generating a magnetic field which spatially varies around an axis of the circuit board in a cyclic manner and with an angular frequency of M; and (b) a second winding which is wound around said axis and which has a plurality of loop portions circumferentially spaced around said axis of rotation, which winding is operable, when energised, for generating a magnetic field which spatially varies around said axis in a cyclic manner and which comprises a fundamental component with an angular frequency of N and some harmonic components thereof, wherein N<M and wherein the circumferential spacing between said loop portions is arranged so as to reduce the amount of some of the harmonic components which are generated by said second winding when it is energised; and a second circuit board comprising at least two layers of conductor tracks which are connected together at a plurality of vias to form:

(a) a first sensor winding which is wound around an axis of the second circuit board in a cyclic manner so as to have a sensitivity to magnetic fields which spatially vary around said axis with an angular frequency of M; and (b) a second sensor winding which is wound around said axis in a cyclic manner so as to have a sensitivity to magnetic fields which spatially vary around said axis with an angular frequency of N.

62. A method of detecting the position of first and second members, at least one of which is rotatable relative to the other about an axis of rotation, the method comprising the steps of:

providing on the first member (a) a first magnetic field generator for generating a magnetic field which spatially varies around said axis of rotation in a cyclic manner with an angular frequency of M; and (b) a second magnetic field generator comprising a winding which is wound around said axis of rotation and which has a plurality of loop portions circumferentially spaced around said axis of rotation, for generating a magnetic field which spatially varies around said axis of rotation in a cyclic manner and which comprises a fundamental component with an angular frequency of N and harmonic components thereof, wherein N<M and wherein the circumferential spacing between said loop portions is arranged so as to reduce the amount of predetermined ones of the harmonic components generated by said second magnetic field generator;

providing on said second member (a) a first sensor which is sensitive to magnetic fields which spatially vary around said axis of rotation in a cyclic manner and with an angular frequency of M; and (b) a second sensor which is sensitive to magnetic fields which spatially vary around said axis of rotation in a cyclic manner and with an angular frequency of N;

generating a magnetic field with said first and second magnetic field generators;

sensing the magnetic fields generated by said first and second magnetic field generators with said sensors, to generate first and second signals which vary with the relative angular position of the first and second members; and determining the relative angular position of said first and second members from said first and second signals.

63. A rotary position detector, comprising:

first and second members, at least one of which is rotatable relative to the other about an axis of rotation;

said first member comprising:

(a) a first magnetic field generator operable to generate a magnetic field which spatially varies around said axis of rotation in a cyclic manner with an angular frequency of M; and (b) a second magnetic field generator comprising a winding which is wound around said axis of rotation and which has a plurality of loop portions circumferentially spaced around said axis of rotation, and operable to generate a magnetic field which spatially varies around said axis of rotation in a cyclic manner and which comprises a fundamental component with an angular frequency of N and harmonic components thereof, wherein N<M and wherein the circumferential spacing between said loop portions is arranged so as to reduce the amount of predetermined ones of the harmonic components generated by said second magnetic field generator;

said second member comprising:

(a) a first sensor which is sensitive to magnetic fields which spatially vary around said axis of rotation in a cyclic manner and with an angular frequency of H; and (b) a second sensor which is sensitive to magnetic fields which spatially vary around said axis of rotation in a cyclic manner and with an angular frequency of N;

wherein, in response to a magnetic field being generated by said first and second magnetic field generators, first and second signals are generated by said first and second sensors respectively, which signals vary with the relative angular position of said first and second members; and a position processor operable to process said first and second signals to determine the relative angular position of said first and second members.

64. A rotary position detector, comprising:

first and second members, at least one of which is rotatable relative to the other about an axis of rotation;

said first member comprising:

(a) a first magnetic field generator operable to generate a magnetic field which spatially varies around said axis of rotation in a cyclic manner with an angular frequency of N; and (b) a second magnetic field generator comprising a winding which is wound around said axis of rotation and which has a plurality of loop portions circumferentially spaced around said axis of rotation, operable to generate a magnetic field which spatially varies around said axis of rotation in a cyclic manner and which comprises a fundamental component with an angular frequency of N and some harmonic components thereof, wherein N<M and wherein the circumferential spacing between said loop portions is arranged so as to try to eliminate predetermined ones of said harmonic components generated by said second magnetic field generator;

said second member comprising:

(a) a first sensor which is sensitive to magnetic fields which spatially vary around said axis of rotation in a cyclic manner and with an angular frequency of M; and (b) a second sensor which is sensitive to magnetic fields which spatially vary around said axis of rotation in a cyclic manner and with an angular frequency of N;

wherein, in response to a magnetic field being generated by said first and second magnetic field generators, first and second signals are generated by said first and second sensors respectively, which signals vary with the relative angular position of said first and second members; and a position processor operable to determine the relative angular position of said first and second members using said first and second signals.

65. A rotary position detector, comprising:

first and second members, at least one of which is rotatable relative to the other about an axis of rotation; said first member comprising:
- (a) a first magnetic field generator operable to generate a magnetic field which spatially varies around said axis of rotation in a cyclic manner with an angular frequency of M; and
- (b) a second magnetic field generator comprising a winding which is wound around said axis of rotation and which has a plurality of loop portions circumferentially spaced around said axis of rotation, and operable to generate a magnetic field which spatially varies around said axis of rotation in a cyclic manner and which comprises a fundamental component with an angular frequency of b~ and some harmonic components thereof,
    - wherein N<M and wherein the circumferential spacing between said loop portions is arranged so as to reduce the amount of some of the harmonic components generated by said second magnetic field generator, relative to the amount of said harmonic components which exist in a corresponding square wave signal;

said second member comprising;
- (a) a first sensor which is sensitive to magnetic fields which spatially vary around said axis of rotation in a cyclic manner and with an angular frequency of M; and
- (b) a second sensor which is sensitive to magnetic fields which spatially vary around said axis of rotation in a cyclic manner and with an angular frequency of N;
    - wherein, in response to a magnetic field being generated by said first and second magnetic field generators, first and second signals are generated by said first and second sensors respectively, which signals vary with the relative angular position of said first and second members; and
    - a position processor operable to determine the relative angular position of said first and second members using said first and second signals.

66. A rotary position detector, comprising: first and second members, at least one of which is rotatable relative to the other about an axis of rotation;

said first member comprising:
- (a) a first magnetic field generator operable to generate a magnetic field which spatially varies around said axis of rotation in a cyclic manner with an angular frequency of M; and
- (b) a second magnetic field generator comprising a winding which is wound around said axis of rotation and which has a plurality of loop portions circumferentially spaced around said axis of rotation, and operable to generate a magnetic field which spatially varies around said axis of rotation in a cyclic manner and which comprises a fundamental component with an angular frequency of N and some harmonic components thereof, wherein N<M and wherein the circumferential spacing between said loop portions is arranged so as to reduce the amount of the harmonic components generated by said second magnetic field generator which have an angular frequency of N±1;

said second member comprising:
- (a) a first sensor which is sensitive to magnetic fields which spatially vary around said axis of rotation in a cyclic manner and with an angular frequency of M;
- (b) a second sensor which is sensitive to magnetic fields which spatially vary around said axis of rotation in a cyclic manner and with an angular frequency of N;
    - wherein, in response to a magnetic field being generated by said first and second magnetic field generators, first and second signals are generated by said first and second sensors respectively, which signals vary with the relative angular position of said first and second members; and
    - a position processor operable to determine the relative angular position of said first and second members from said first and second signals.

67. A rotary position detector, comprising: first and second members, at least one of which is rotatable relative to the other about an axis of rotation;

said first member comprising:
- (a) a first magnetic field generator operable to generate a magnetic field which spatially varies around said axis of rotation in a cyclic manner with an angular frequency of M; and
- (b) a second magnetic field generator comprising a winding which is wound around said axis of rotation and which has a plurality of loop portions circumferentially spaced around said axis of rotation, and operable to generate a magnetic field which spatially varies around said axis of rotation in a cyclic manner and which comprises a fundamental component with an angular frequency of N and some harmonic components thereof,
    - wherein N<M and wherein the circumferential spacing between said loop portions is arranged so as to eliminate the harmonic components generated by said second magnetic field generator which have an angular frequency of M±1;

said second member comprising:
- (a) a first sensor which is sensitive to magnetic fields which spatially vary around said axis of rotation in a cyclic manner and with an angular frequency of M; and
- (b) a second sensor which is sensitive to magnetic fields which spatially vary around said axis of rotation in a cyclic manner and with an angular frequency of N;
    - wherein, in response to a magnetic field being generated by said first and second magnetic field generators, first and second signals are generated by said first and second sensors respectively, which signals vary with the relative angular position of said first and second members; and
    - a position processor operable to determine the relative angular position of said first and second members from said first and second signals.

68. A transducer for use in a rotary position detector, comprising:
- (a) a first magnetic field generator operable to generate a magnetic field which spatially varies around an axis in a cyclic manner with an angular frequency of
- (b) a second magnetic field generator comprising a winding which is wound around said axis and which has a plurality of loop portions circumferentially spaced around said axis of rotation, and operable to generate a magnetic field which spatially varies around said axis n a cyclic manner and which comprises a fundamental component with an angular frequency of N and some harmonic components thereof, wherein N<M and wherein the circumferential spacing between said loop portions is arranged so as to reduce the amount of some of the harmonic components generated by said second magnetic field generator;

c) a first sensor which is sensitive to magnetic fields which spatially vary around said axis in a cyclic manner and with an angular frequency of M; and (d) a second sensor which is sensitive to magnetic fields which spatially vary around said axis in a cyclic manner and with an angular frequency of N.

69. A transducer for use in a rotary position detector, comprising:

a first circuit board comprising at least two layers of conductor tracks which are connected together at a plurality of vias to form;

(a) a first winding which, when energised, is operable to generate a magnetic field which spatially varies around an axis of the circuit board in a cyclic manner and with an angular frequency of M; and (b) a second winding which is wound around said axis and which has a plurality of loop portions circumferentially spaced around said axis of rotation, which second winding is operable, when energised, to generate a magnetic field which spatially varies around said axis in a cyclic manner and which comprises a fundamental component with an angular frequency of N and some harmonic components thereof, wherein N<M and wherein the circumferential spacing between said loop portions is arranged so as to reduce the amount of some of the harmonic components which are generated by said second winding when it is energised; and a second circuit board comprising at least two layers of conductor tracks which are connected together at a plurality of vias to form:

(a) a third winding which is wound around an axis of the second circuit board in a cyclic manner so as to have a sensitivity to magnetic fields which spatially vary around said axis with an angular frequency of M; and (b) a fourth winding which is wound around said axis in a cyclic manner so as to have a sensitivity to magnetic fields which spatially vary around said axis with an angular frequency of N.

70. A rotary position detector, comprising:

first and second members, at least one of which is rotatable relative to the other about an axis of rotation;

said first member comprising:

(a) a first magnetic field generator operable to generate a magnetic field which spatially varies around said axis of rotation in a cyclic manner with an angular frequency of M; and (b) a second magnetic field generator comprising a winding which is wound around said axis of rotation and which has a plurality of loop portions circumferentially spaced around said axis of rotation, and operable to generate a magnetic field which spatially varies around said axis of rotation in a cyclic manner and which comprises a fundamental component with an angular frequency of N and harmonic components thereof, wherein N<M and wherein the circumferential spacing between said loop portions is arranged so as to reduce the amount of predetermined ones of the harmonic components generated by said second magnetic field generator;

said second member comprising:

(a) a first winding which is sensitive to magnetic fields which spatially vary around said axis of rotation in a cyclic manner and with an angular frequency of M; and (b) a second winding which is sensitive to magnetic fields which spatially vary around said axis of rotation in a cyclic manner and with an angular frequency of N;

wherein, in response to a magnetic field being generated by said first and second magnetic field generators, first and second signals are generated by said first and second windings respectively, which signals vary with the relative angular position of said first and second members; and a position processor operable to process said first and second signals to determine the relative angular position of said first and second members.

71. A transducer for use in a rotary position detector, comprising:

(a) a first magnetic field generator operable to generate a magnetic field which spatially varies around an axis in a cyclic manner with an angular frequency of M; and (b) a second magnetic field generator comprising a winding which is wound around said axis and which has a plurality of loop portions circumferentially spaced around said axis of rotation, and operable to generate a magnetic field which spatially varies around said axis in a cyclic manner and which comprises a fundamental component with an angular frequency of N and some harmonic components thereof, wherein N<M, and wherein the circumferential spacing between said loop portions is non-uniform and is arranged so as to reduce the amount of some of the harmonic components generated by said second magnetic field generator, relative to the amount of said harmonic components which exist in a corresponding square wave signal.

72. A rotary position detector, comprising:

first and second members, at least one of which is rotatable relative to the other about an axis of rotation;

said first member comprising:

(a) a first magnetic field generator operable to generate a magnetic field which spatially varies around said axis of rotation in a cyclic manner with an angular frequency of H; and (b) a second magnetic field generator comprising a winding which is wound around said axis of rotation and which has a plurality of loop portions circumferentially spaced around said axis of rotation, and operable to generate a magnetic field which spatially varies around said axis of rotation in a cyclic manner and which comprises a fundamental component with an angular frequency of N and harmonic components thereof, wherein N<M and wherein the circumferential spacing between said loop portions is non-uniform and arranged so as to reduce the amount of predetermined ones of the harmonic components generated by said second magnetic field generator relative to the amount of said harmonic components which exist in a corresponding square wave signal;

said second member comprising:
- (a) a first excitation winding which is operable to generate a magnetic field which spatially varies around said axis of rotation in a cyclic manner and with an angular frequency of H for energising said first magnetic field generator;
- (b) a second excitation winding which is operable to generate a magnetic field which spatially varies around said axis of rotation in a cyclic manner with an angular frequency of N, for energising said second magnetic field generator; and
- (c) a sensor winding which is sensitive to magnetic fields which spatially vary around said axis of rotation in a cyclic manner with an angular frequency of N and M;

wherein upon excitation by said first and second excitation windings, first and second signals are generated by said sensor winding, which signals vary with the relative angular position of said first and second members; and a position processor operable to process said first and second signals to determine the relative angular position of said first and second members.

* * * * *

UNITED STATES PATENT AND TRADEMARK OFFICE
CERTIFICATE OF CORRECTION

PATENT NO. : 6,534,970 B1
DATED : March 18, 2003
INVENTOR(S) : Ely et al.

It is certified that error appears in the above-identified patent and that said Letters Patent is hereby corrected as shown below:

Column 8,
Line 18, delete "sin(M$\theta$)" and insert -- sin(m$\theta$) -- therefor.
Line 45, insert -- $\theta_r$ -- after "is rotated by".

Column 14,
Line 47, insert -- ± -- before "1/32".

Column 15,
Line 40, delete "$\alpha_2$" and insert -- $\alpha^2$ -- therefor.

Column 17,
Line 67, delete "trick" and insert -- thick -- therefor.

Column 23,
Line 59, insert -- to -- before "claim 1".

Signed and Sealed this

Second Day of September, 2003

JAMES E. ROGAN
*Director of the United States Patent and Trademark Office*